United States Patent
Terayama et al.

(10) Patent No.: US 12,503,038 B2
(45) Date of Patent: Dec. 23, 2025

(54) LAMP SYSTEM

(71) Applicant: Koito Manufacturing Co., Ltd., Tokyo (JP)

(72) Inventors: Takashi Terayama, Shizuoka (JP); Mitsuharu Mano, Shizuoka (JP); Takao Muramatsu, Shizuoka (JP); Shigeyuki Watanabe, Shizuoka (JP); Kana Serizawa, Shizuoka (JP); Hikaru Nagai, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/664,823

(22) Filed: May 15, 2024

(65) Prior Publication Data
US 2024/0294111 A1   Sep. 5, 2024

Related U.S. Application Data

(63) Continuation of application No. PCT/JP2022/042445, filed on Nov. 15, 2022.

(30) Foreign Application Priority Data

Nov. 17, 2021 (JP) ................................ 2021-187327
Nov. 17, 2021 (JP) ................................ 2021-187328
(Continued)

(51) Int. Cl.
*B60Q 1/115* (2006.01)
*F21S 41/663* (2018.01)
*F21W 102/14* (2018.01)

(52) U.S. Cl.
CPC ............ *B60Q 1/115* (2013.01); *F21S 41/663* (2018.01); *B60Q 2300/056* (2013.01); *F21W 2102/14* (2018.01)

(58) Field of Classification Search
CPC ............. B60Q 1/115; B60Q 2300/056; B60Q 2300/054; B60Q 2300/112;
(Continued)

(56) References Cited

U.S. PATENT DOCUMENTS 6,229,263 B1   5/2001 Izawa
9,855,887 B1   1/2018 Potter et al.
(Continued)

FOREIGN PATENT DOCUMENTS

CN    104802697 A    7/2015
DE    102016122066 A1    5/2018
(Continued)

OTHER PUBLICATIONS

Extended European Search Report issued on Nov. 12, 2024, in corresponding European Patent Application No. 24176175.8. (9 pages).
(Continued)

*Primary Examiner* — Elmito Breval
(74) *Attorney, Agent, or Firm* — BUCHANAN, INGERSOLL & ROONEY PC

(57) ABSTRACT

A high-definition lamp unit contains a plurality of individually controllable pixels, and emits lamp beam having light distribution corresponding to states of the pixels. A first sensor is provided to enable detection of a dynamic component of a pitch angle of a traveling vehicle body. A controller shifts the level of a cut-off line CL of the light distribution up and down, corresponding to the dynamic component of the pitch angle of the vehicle body, with reference to a predetermined level defined as a base.

36 Claims, 31 Drawing Sheets

(30) Foreign Application Priority Data

Nov. 17, 2021 (JP) ................. 2021-187329
May 18, 2022 (JP) ................. 2022-081842

(58) Field of Classification Search
CPC ........ B60Q 2300/114; B60Q 2300/116; B60Q 2300/122; B60Q 2300/132; B60Q 2300/32; B60Q 2300/322; F21S 41/663; F21S 41/153; F21W 2102/14; F21W 2102/155
See application file for complete search history.

(56) References Cited

U.S. PATENT DOCUMENTS

| | | |
|---|---|---|
| 2004/0027834 A1 | 2/2004 | Chigusa et al. |
| 2012/0268958 A1 | 10/2012 | Kasaba et al. |
| 2020/0198525 A1 | 6/2020 | Mueller et al. |

FOREIGN PATENT DOCUMENTS

| | | | |
|---|---|---|---|
| DE | 102019217978 A1 | 5/2021 | |
| GB | 2346436 A * | 8/2000 | ............. B60Q 1/115 |
| JP | 2000211423 A | 8/2000 | |
| JP | 2004071409 A | 3/2004 | |
| JP | 2013086747 A | 5/2013 | |
| JP | 2017056828 A | 3/2017 | |
| JP | 2019038279 A | 3/2019 | |
| JP | 6861044 B2 | 3/2021 | |
| KR | 1020100018366 A | 2/2010 | |
| WO | 2017061121 A1 | 4/2017 | |

OTHER PUBLICATIONS

Extended European Search Report issued on Jan. 31, 2025, in corresponding European Patent Application No. 22895608.2. (8 pages).
International Preliminary Report on Patentability Chapter I (PCT/IB/373) with translation mailed on May 2, 2024 by The International Bureau of WIPO in corresponding International Patent Application No. PCT/JP2022/042445. (12 pages).
International Search Report (PCT/ISA/210) with translation mailed on Dec. 20, 2022 by the Japan Patent Office as the International Searching Authority for International Application No. PCT/JP2022/042445. (6 pages).

* cited by examiner

LAMP SYSTEM

BACKGROUND

1. Technical Field

The present disclosure relates to a vehicle lamp.

2. Description of the Related Art

Light distribution pattern of vehicle headlamp is regulated by law, so as not to cause glare to a nearby traffic participant. A vehicle body will have front-rear inclination that varies depending on the number of passengers and the weight of baggage. This varies inclination of the optical axis of the headlamp relative to the road face (ground face), whereby the irradiation range of the headlamp shifts up and down. Upward shift of the irradiation range would cause the glare, meanwhile downward shift would narrow the irradiation range ahead of the vehicle.

The headlamp has therefore a built-in leveling actuator, aimed at correcting shift of the optical axis of the headlamp caused by changes in the front-rear inclination of the vehicle body. A technology called auto-leveling has been known, which automatically controls the leveling actuator in compliance with inclination of the vehicle body. The auto-leveling acts to acquire front-rear inclination of the vehicle body with use of a vehicle-borne sensor, and to correct the optical axis of a lamp unit in the headlamp with use of the actuator, so as to cancel the inclination.

CITATION LIST

Patent Literature

Patent Literature 1: WO2017/061121 A1
Patent Literature 2: JP 2019-38279 A
Patent Literature 3: JP 6861044 B
Patent Literature 4: JP 2017-56828 A Prior auto-leveling has been designed while focused on meeting the regulations that prohibits causing glare to a nearby traffic participant, while leaving glare associated with sudden vibration of the traveling vehicle body acceptable in most cases.

SUMMARY

The present disclosure has been made considering such situation, wherein exemplary one of the objects thereof is to provide a lamp system that can suppress glare associated with the sudden vibration of the traveling vehicle body.

1. A lamp system according to one mode of the present disclosure includes: an adaptive driving beam lamp structured to emit lamp beam with a variable light distribution; a first sensor that contains a gyro sensor; a second sensor that contains a vehicle height sensor or an acceleration sensor; and a controller structured to shift a height of a cut-off line of the light distribution, corresponding to an output of the first sensor and an output of the second sensor.

One mode of the present disclosure relates to a method for controlling an adaptive driving beam lamp structured to emit lamp beam with a variable light distribution. The control method includes: monitoring a state of a vehicle body, with use of a first sensor that contains a gyro sensor, and a second sensor that contains a vehicle height sensor or an acceleration sensor; and shifting a height of a cut-off line of the light distribution, corresponding to an output of the first sensor and an output of the second sensor.

2. A lamp system according to one mode of the present disclosure includes: an adaptive driving beam lamp structured to emit lamp beam with a variable light distribution; a first sensor that contains a gyro sensor; and a controller structured to shift a height of a cut-off line of the light distribution, corresponding to an output of the first sensor. The first sensor is disposed on a vehicle side.

3. A lamp system according to one mode of the present disclosure includes: an adaptive driving beam lamp arranged in a headlamp, and is structured to emit lamp beam with a variable light distribution; a first sensor that contains a gyro sensor arranged in the headlamp, or externally attached to the headlamp; and a controller structured to shift a height of a cut-off line of the light distribution, corresponding to an output of the first sensor.

A headlamp according to one mode of the present disclosure includes: an adaptive driving beam lamp structured to emit lamp beam with a variable light distribution; a first sensor that contains a gyro sensor; and a controller structured to shift a height of a cut-off line of the light distribution, corresponding to an output of the first sensor.

Note that also free combinations of these constituents, and also any of the constituents and expressions exchanged among the method, apparatus and system, are valid as the modes of the present disclosure. Also note that the description of this section (SUMMARY OF THE INVENTION) does not describe all essential features of the invention, and thus also subcombinations of these features described may constitute the invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 15 is a drawing illustrating a second pitch angle θa;

DETAILED DESCRIPTION

Outline of Embodiments

Figure 1:
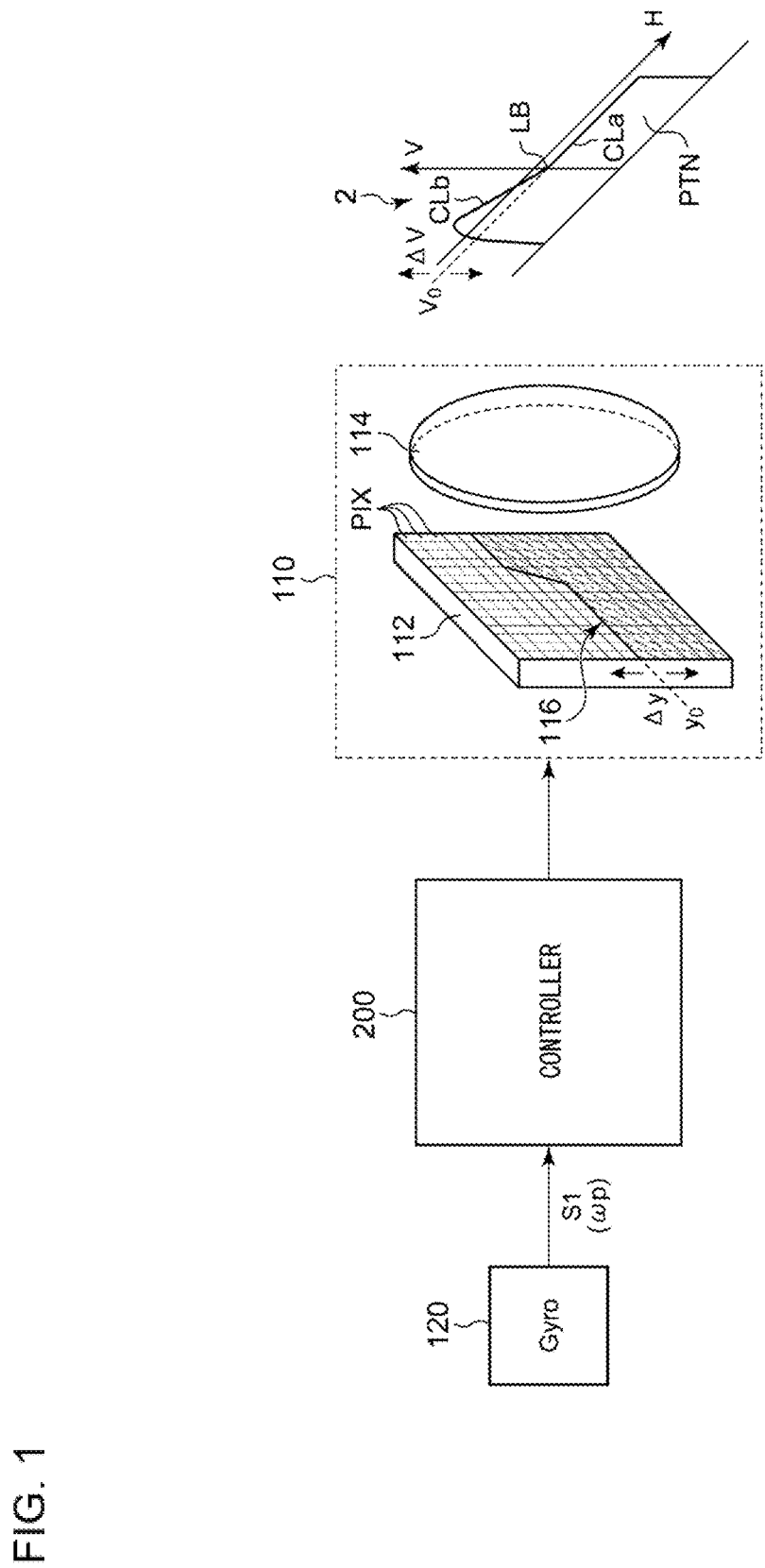
FIG. 1 is a block diagram illustrating a lamp system of embodiment 1.

Some exemplary embodiments of the present disclosure will be outlined. This outline will provide introduction into the detailed description that follows, and will brief some concepts of one or more embodiments for basic understanding thereof, without limiting the scope of the invention or disclosure. Also note this summary is not a comprehensive overview of all possible embodiments, and thus does not limit the essential components of the embodiments. For convenience, the term "one embodiment" may be used to designate one embodiment (Example or Modified Example), or a plurality of embodiments (Examples or Modified Examples) disclosed in the present specification.

1. A lamp system according to one embodiment includes: an adaptive driving beam lamp structured to emit lamp beam with a variable light distribution; a first sensor that contains a gyro sensor; a second sensor that contains a vehicle height sensor or an acceleration sensor; and a controller structured to shift a height of a cut-off line of the light distribution, corresponding to an output of the first sensor and an output of the second sensor.

This structure, having the first sensor and the second sensor combined therein, enables independent detection of static change in posture (static change in pitch angle) of a vehicle body typically depending on the number of passengers, the weight of baggage and the weight of fuel; and sharp change in the pitch angle due to slope of road face on which the vehicle travels, and irregularity or undulation that resides on the road face. This also enables control of the light distribution adaptive to the nature of the detected pitch angle, and can therefore suppress glare due to sudden vibration of the vehicle body during travel. The control of the height of the cut-off line is also referred to as optical axis control.

In one embodiment, the controller may control the height of the cut-off line, with reference to a synthetic value of a first pitch angle derived from an output of the first sensor, and a second pitch angle derived from an output of the second sensor. Synthesis of the pitch angles obtained by the two sensors, having different characteristics, now makes it possible to estimate vehicle posture with high accuracy.

In one embodiment, the synthetic value may be derived from a value obtained by weighted addition of the first pitch angle and the second pitch angle, with a weighting factor dynamically variable. Reliabilities of the first pitch angle and the second pitch angle are variable corresponding to the travel situation. Even if the reliabilities were equal, which of the first pitch angle and the second pitch angle should be reflected in the optical axis control will differ depending on the travel situation. Hence, appropriate optical axis control is enabled by varying the weighting factor corresponding to the travel situation.

In one embodiment, the weighting factor may vary corresponding to at least one of the output of the first sensor, the output of the second sensor, the first pitch angle, or the second pitch angle. The weighting factor is variable typically corresponding to the frequency, amplitude level or duration of vibration contained therein.

In one embodiment, the weighting factor may vary with information from the vehicle.

In one embodiment, the information from the vehicle may contain at least one of vehicle speed, steering angle, camera image, map information, or infrastructure information.

In one embodiment, the weighting factor may vary with travel situation.

In one embodiment, the output of the first sensor may be dominant, upon travel across a large step.

In one embodiment, the output of the second sensor may be dominant while the vehicle stops.

In one embodiment, the output of the second sensor may be dominant during travel on a flat road.

The output of the second sensor may be dominant, during travel over small irregularity.

In one embodiment, the output of the first sensor may be dominant, at a start point of a slope.

In one embodiment, the output of the second sensor may be dominant, at a point in the middle of a slope.

In one embodiment, the output of the first sensor may be dominant, at an end point of a slope.

In one embodiment, the output of the first sensor may be dominant, upon sudden acceleration or sudden deceleration of a vehicle body.

In one embodiment, the controller may shift the level of a cut-off line of the light distribution up and down, corresponding to the dynamic component of the pitch angle of the vehicle body, with reference to a predetermined level.

This structure can prevent glare, if the vehicle body sinks down in the rear part (nose-up), by shifting down the cut-off line, meanwhile can prevent far field of view from dimming, if the vehicle body sinks down in the front part (nose-dive), by shifting up the cut-off line.

In addition, with the control made adaptive to dynamic changes in the pitch angle of the vehicle body, the level of the cut-off line may be kept constant on a virtual perpendicular screen ahead of the vehicle, even if the vehicle body causes front-rear vibration, thereby preventing an object ahead of the vehicle from being looked bright and dark, and thus successfully providing an improved field of view.

In one embodiment, the control characteristic of the controller may be different between upward shift of the cut-off line from a predetermined level, and downward shift of the cut-off line from the predetermined level. Upward shift of the cut-off line from the predetermined level would give glare to a nearby traffic participant, due to influence of delay in the control. Suppression of glare and improvement of the field of view can therefore be appropriately balanced, by making a difference between the control characteristics for the upward direction and the downward direction.

In one embodiment, the predetermined level may be determined with reference to a level on which the cut-off line should fall when the vehicle body stands still. In this case, it suffices to detect pitching with reference to the stationary state to dynamically control the cut-off line, whereby the process is simplified.

In one embodiment, the speed of upward shifting of the cut-off line may be slower than the speed of downward shifting of the cut-off line.

In one embodiment, the amount of upward shift of the cut-off line may be smaller than the amount of downward shift of the cut-off line, per the same change in the pitch angle.

In one embodiment, the shift of the cut-off line may be invalidated, corresponding to the travel situation. The control of the cut-off line may be invalidated, if pitching occurs too rapidly to be followed, or if shifting of the cut-off line unfortunately degrades the field of view.

In one embodiment, the upward shift of the cut-off line may be invalidated, corresponding to the travel situation. When the pitching occurs too rapidly to be followed, the upward shift of the cut-off line may be invalidated to prevent the glare.

In one embodiment, if the cut-off line resides above a predetermined level, the illuminance in a range above the predetermined level may be reduced. This successfully reduces glare to other traffic participant, even if a control delay should occur.

In one embodiment, if the cut-off line resides above a predetermined level, the illuminance in a range above the predetermined level may be gradated so as to be gradually dimmed upwards. This successfully reduces glare to other traffic participant, even if a control delay should occur.

A lamp system according to one embodiment includes: an adaptive driving beam lamp that contains a plurality of individually controllable pixels, and is enabled to emit lamp beam having a light distribution including a cut-off line, corresponding to state of the pixels; a sensor structured to enable detection of a pitch angle of a traveling vehicle; and, a controller structured to detect a dynamic deviation of the pitch angle from a reference value corresponding to an output of the sensor, and to control the adaptive driving beam lamp so as to keep an angle between a beam that corresponds to the cut-off line of the light and the road face constant, corresponding to the deviation.

This structure can prevent glare, if the vehicle body sinks down in the rear part, by shifting down the cut-off line, meanwhile can prevent far field of view from dimming, if the vehicle body sinks down in the front part, by shifting up the cut-off line.

In addition, with the control made adaptive to dynamic changes in the pitch angle of the vehicle body, the level of the cut-off line may be kept constant on a virtual perpendicular screen ahead of the vehicle, even if the vehicle body causes front-rear vibration, thereby preventing an object ahead of the vehicle from being looked bright and dark, and thus successfully providing an improved field of view.

In one embodiment, the sensor may contain a gyro sensor. The dynamic pitch angle may be determined by acquiring the angular velocity in the pitch direction with use of the gyro sensor, and then by integrating the angular velocity.

A controller according to one embodiment constitutes a lamp system, together with an adaptive driving beam lamp. The adaptive driving beam lamp contains a plurality of pixels individually controllable corresponding to image data, and can emit lamp beam with a light distribution corresponded to the image data. The controller has a correction unit that detects a dynamic component of a pitch angle of the vehicle body in response to an output of the sensor, and shifts the level of the cut-off line of light distribution contained in the image data upwards or downwards with reference to a predetermined level, so as to cancel the dynamic component of the pitch angle.

This structure can control the light distribution corresponding to the pitch angle, by shifting the level of the cut-off line on the image data. This can prevent glare, if the vehicle body sinks down in the rear part, by shifting down the cut-off line, meanwhile can prevent far field of view from dimming, if the vehicle body sinks down in the front part, by shifting up the cut-off line.

In addition, with the control made adaptive to dynamic changes in the pitch angle of the vehicle body, the level of the cut-off line may be kept constant on a virtual perpendicular screen ahead of the vehicle, even if the vehicle body causes front-rear vibration, thereby preventing an object ahead of the vehicle from being looked bright and dark, and thus successfully providing an improved field of view.

A control method according to one embodiment relates to a method for controlling an adaptive driving beam lamp that contains a plurality of individually controllable pixels, and emits lamp beam having light distribution corresponding to states of the pixels. The control method includes detecting a dynamic component of a pitch angle of a driving vehicle body; and shifting the level of the cut-off line of light distribution upwards or downwards with reference to a predetermined level, corresponding to the dynamic component of the pitch angle of the vehicle body.

2. A lamp system according to one embodiment includes: an adaptive driving beam lamp structured to emit lamp beam with a variable light distribution; a first sensor that contains a gyro sensor; and a controller structured to shift a height of a cut-off line of the light distribution, corresponding to an output of the first sensor. The first sensor is disposed on a vehicle side.

This structure can detect sharp change in the pitch angle due to irregularity or undulation that resides on the road face, with use of a gyro sensor. This also suppresses glare caused by sudden vibration of the traveling vehicle body, by controlling the light distribution corresponding to change in the detected pitch angle. The control of the height of the cut-off line is also referred to as optical axis control.

The headlamp is relatively easily attachable to and detachable from the vehicle body as compared with other car components, so that the positional relation between the headlamp and the vehicle body is expected to contain a certain degree of error. Now the structure, having the gyro sensor built in or externally attached to the headlamp, would degrade detection accuracy of change in the pitch angle, due to limited accuracy of assembly of the headlamp per se to the vehicle body. In the aforementioned structure, the error in the positional relation between the vehicle body and the gyro sensor may be reduced, by isolating the gyro sensor from the headlamp and instead arranging it on the vehicle side, whereby the detection accuracy of change in the pitch angle may be enhanced. The term "vehicle side" means physical independence from the headlamp, and encompasses a space in a cabin, as well as in an engine room.

In one embodiment, the controller may include: a first processor that is arranged on the vehicle side, and structured to calculate a first pitch angle in response to an output of the first sensor; and a second processor that is arranged on the vehicle side, and is structured to receive an output of the first processor through a vehicle bus, and to control the height of the cut-off line of the light distribution, in response to the output.

A vehicle bus such as a controller area network (CAN) is used for transmitting the angular velocity signal from a unit on the vehicle side to a unit in the headlamp. CAN communication, however, suffers from transmission delay. In a case where the gyro sensor transmits angular velocity signals, which are sequentially generated at a predetermined sampling rate, to a controller through the vehicle bus, high-speed change in the pitch angle will become difficult to be followed, due to transmission delay through the vehicle bus, as well as time necessary for integrating the angular velocity, followed by conversion to the pitch angle on the controller side. In the aforementioned structure, a process on the vehicle side takes place so as to integrate the angular velocity signals, then to convert the result to the pitch angle information, and then to transmit the pitch angle information through the vehicle bus to the second processor. This makes it possible to reduce the volume of data to be transmitted through the vehicle bus, and to sequentially integrate the signals without delay, thus making it possible to shorten the total delay time, whereby faster change in the pitch angle becomes followable.

In one embodiment, the first sensor and the first processor may be unitized.

In one embodiment, the lamp system may further have a second sensor that contains an acceleration sensor or a vehicle height sensor, provided to the vehicle side. The first processor may calculate the second pitch angle in response to the output of the second sensor, and may output the result to the second processor.

Combination of the first sensor and the second sensor enables independent detection of static change in posture (static change in pitch angle) of a vehicle body typically depending on the number of passengers, the weight of baggage and the weight of fuel; and sharp change in the pitch angle due to slope of road face on which the vehicle travels, and irregularity or undulation that resides on the road face. This also enables control of the light distribution adaptive to the nature of the detected pitch angle, and can therefore suppress glare due to sudden vibration of the vehicle body during travel.

In one embodiment, the second sensor may contain an acceleration sensor. The gyro sensor and the acceleration sensor may be unitized as a six-axis sensor.

In one embodiment, the first processor may generate a future predicted value of the first pitch angle, in response to the output of the first sensor, and the second processor may shift the height of the cut-off line in response to the predicted value. Use of the predicted value can recover an influence of the transmission delay or process delay of the signals, whereby faster change in the pitch angle becomes followable.

In one embodiment, the first processor may conduct Fourier transformation of the output of the first sensor, and may generate the predicted value of the first pitch angle, corresponding to a frequency component contained in the transformed result.

In one embodiment, the first processor may output a provisional predicted value upon start of vibration, and then may output the predicted value generated by processing. Use of the provisional predicted value enables the leveling control, even in a situation upon start of vibration where accuracy of prediction is low.

In one embodiment, in a case where vibration preceded by nose-dive occurred on a vehicle on which the adaptive driving beam lamp is mounted, the controller may keep the height of the cut-off line unchanged, during a period of the first nose-dive. This makes it possible to prevent glare from being applied to an oncoming vehicle, a preceding vehicle, and so forth.

In one embodiment, in a case where vibration preceded by nose-up occurred on a vehicle on which the adaptive driving beam lamp is mounted, the controller may shift down the height of the cut-off line by a predetermined width, during a period of the first nose-dive. This makes it possible to prevent glare from being applied to an oncoming vehicle, a preceding vehicle, and so forth.

In one embodiment, in a case where vibration preceded by nose-up occurred on a vehicle on which the adaptive driving beam lamp is mounted, the controller may reduce brightness near the cut-off line, while keeping the height of the cut-off line unchanged, during a period of the first nose-dive. This makes it possible to prevent glare from being applied to an oncoming vehicle, a preceding vehicle, and so forth.

In one embodiment, the adaptive driving beam lamp may contain a plurality of individually controllable pixels, and may be structured to create a light distribution corresponding to states of the pixels. The controller may shift the boundary between the on-pixel and the off-pixel from among the pixels up and down.

In one embodiment, the vehicle side may reside in a cabin. Inside of the engine room is environmentally severe, and is susceptible to influence of temperature change or humidity change. Placement of the gyro sensor inside the engine room would degrade accuracy of detection of the pitch angle variation, since the output of the gyro sensor would be affected by the environment. The aforementioned structure, with the gyro sensor placed in the cabin, can suppress the detection accuracy from degrading.

3. A lamp system according to one embodiment includes: an adaptive driving beam lamp arranged in a headlamp, and is structured to emit lamp beam with a variable light distribution; a first sensor that contains a gyro sensor arranged in the headlamp, or externally attached to the headlamp; and a controller structured to shift a height of a cut-off line of the light distribution, corresponding to an output of the first sensor.

This structure can detect sharp change in the pitch angle due to irregularity or undulation that resides on the road face, with use of a gyro sensor. This also suppresses glare caused by sudden vibration of the traveling vehicle body, by controlling the light distribution corresponding to change in the detected pitch angle. The control of the height of the cut-off line is also referred to as optical axis control.

Placement of the gyro sensor in the cabin raises the need for transmission of information from inside the cabin to the headlamp, corresponding to the output of the gyro sensor. The transmission of information from inside the cabin to the headlamp necessarily takes place through the vehicle bus, during which a non-negligible transmission delay would occur. The transmission delay reduces the followability of the leveling control. The aforementioned structure, with the gyro sensor arranged on the headlamp side, enables use of a high-speed serial or parallel interface without using the vehicle bus, and thus can significantly reduce the transmission delay, and can enhance the followability of the leveling.

In one embodiment, the gyro sensor may be fixed to the lamp body. The gyro sensor, thus directly fixed to the lamp body of the highest rigidity, can enhance the detection accuracy.

In one embodiment, the gyro sensor may be fixed to the bottom face of the lamp body. The lamp body tends to have a temperature distribution inside thereof, which is hotter towards the top, and is colder towards the bottom. Therefore, placement of the gyro sensor, to the bottom face where the temperature is relatively low, can reduce influence of heat possibly exerted on the gyro sensor.

In one embodiment, the gyro sensor may be arranged inside of the bottom face of the lamp body. In this case, the gyro sensor may be unitized together with the controller. This successfully simplifies the structure of the headlamp.

In one embodiment, the gyro sensor may be arranged outside of the bottom face of the lamp body. Temperature tends to be lower in the outside of the lamp body, than in the inside. Placement of the gyro sensor, to the outside of the lamp body, can therefore reduce influence of heat possibly exerted on the gyro sensor.

In one embodiment, the lamp system may further have a second sensor that contains an acceleration sensor or a vehicle height sensor, provided in the cabin. The controller may control the height of the cut-off line, in response to the output of the first sensor and the output of the second sensor.

Combination of the first sensor and the second sensor enables independent detection of static change in posture (static change in pitch angle) of a vehicle body typically depending on the number of passengers, the weight of baggage and the weight of fuel; and sharp change in the pitch angle due to slope of road face on which the vehicle travels, and irregularity or undulation that resides on the road face. This also enables control of the light distribution adaptive to the nature of the detected pitch angle, and can therefore suppress glare due to sudden vibration of the vehicle body during travel.

In one embodiment, the adaptive driving beam lamp may contain a plurality of individually controllable pixels, and may be structured to create light distribution corresponding to states of the pixels, and the controller may be structured to shift a boundary between an on-pixel and an off-pixel from among the pixels up and down.

A headlamp according to one embodiment includes: an adaptive driving beam lamp structured to emit lamp beam with a variable light distribution; a first sensor that contains a gyro sensor; and a controller structured to shift a height of a cut-off line of the light distribution, corresponding to an output of the first sensor.

EMBODIMENTS

Preferred embodiments will be explained below, referring to the attached drawings. All similar or equivalent constituents, members and processes illustrated in the individual drawings will be given same reference numerals, so as to properly avoid redundant explanations. The embodiments are merely illustrative, and are not restrictive about the disclosure. All features and combinations thereof described in the embodiments are not always essential to the disclosure.

In the present specification, a "state in which a member A is coupled to a member B" includes a case where the member A and the member B are physically and directly coupled, and a case where the member A and the member B are indirectly coupled while placing in between some other member that does not substantially affect the electrically coupled state, or does not degrade the function or effect demonstrated by the coupling thereof.

Similarly, a "state in which member C is provided between member A and member B" includes a case where the member A and the member C, or the member B and the member C are directly connected, and a case where they are indirectly connected, while placing in between some other member that does not substantially affect the electrical connection state among the members, or does not degrade the function or effect demonstrated by the members.

Embodiment 1

FIG. 1 is a block diagram illustrating a lamp system 100 of Embodiment 1. The lamp system 100 is a headlamp that is mounted on an automobile, and illuminates a field of view ahead of the vehicle with light. The automobile can vary the angle of inclination in the front-rear direction, corresponding to the front-rear weight balance. The front-rear inclination angle corresponds to rotation around a horizontal axis that extends in the left-right direction of the vehicle body, and is referred to as a pitch angle θp.

The lamp system 100 has a function (auto leveling function) that automatically adjusts the optical axis of the headlamp in the pitch direction, corresponding to the pitch angle θp.

The lamp system 100 has a high-definition lamp unit 110, a sensor 120, and a controller 200.

In this embodiment, the high-definition lamp unit 110 is an adaptive driving beam lamp which is structured to illuminate a part of, or the entire part of a low beam region. The high-definition lamp unit 110 may alternatively cover a part/all of the high beam region, in addition to a part/all of the low beam region. The high-definition lamp unit 110 contains a plurality of individually controllable pixels PIX, and emits lamp beam with light distribution corresponded to states of the pixels PIX. The high-definition lamp unit 110 typically includes a light emitting element array 112, and an illumination optical system 114. The light emitting element array 112 usable here may be an LED array.

The luminance of each pixel PIX may be controllable in two gradations of ON and OFF, or may be controllable in multiple gradations. The pixels, when structured to be controllable in two gradations of ON and OFF, may alternatively be expressed in multiple gradations with the aid of PWM dimming, by which the individual pixels PIX are switched at high speed, while varying the temporal ratio (duty cycle) between the on-time and the off-time.

The illumination optical system 114 projects the output light from the light emitting element array 112, to the front of the vehicle. The illumination optical system 114 may be a lens optical system, a reflection optical system, or a combination thereof.

FIG. 1 illustrates a virtual perpendicular screen 2. The virtual perpendicular screen 2 is assumed to be a coordinate system with reference to the road face. The virtual perpendicular screen 2 may be 10 m, or 25 m away from the vehicle (lamp). On the virtual perpendicular screen 2, a light distribution pattern PTN is created with the lamp beam of the high-definition lamp unit 110. The light distribution pattern PTN is an intensity distribution of the lamp beam seen on the virtual perpendicular screen 2, which corresponds to an on/off pattern of the plurality of pixels PIX of the light emitting element array 112. Note that the correspondence between the position of a certain pixel, with an illumination area on the virtual perpendicular screen 2 ascribed to the pixel, is determined by the illumination optical system 114, and may be occasionally given in a mirror image relation (left-right inversion), up-down inversion, or up-down and left-right inversion.

The light distribution pattern PTN contains a cut-off line CL. In this example, the light distribution pattern PTN contains a horizontal cut-off line CLa and an oblique cut-off line CLb, which intersect at an elbow point LB.

In this embodiment, the controller 200 corrects the optical axis of the low beam in the pitch angle direction, corresponding to fluctuation of the pitch angle $\theta p$ caused by various factors during stop and travel of the vehicle.

Figure 2:
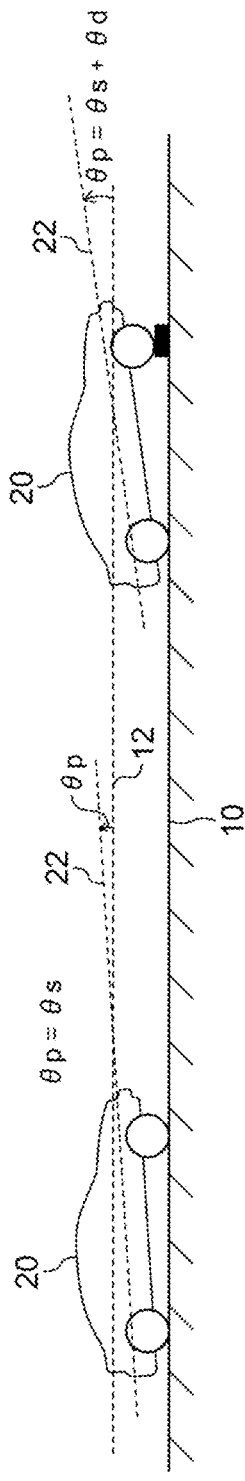
FIG. 2A and FIG. 2B are drawings illustrating pitch angles $\theta p$ of a vehicle body.

FIGS. 2A and 2B are drawings illustrating the pitch angle $\theta p$ of the vehicle body. FIG. 2A illustrates the pitch angle $\theta p$ in a state where the vehicle is in a stop mode. The pitch angle $\theta p$ in a stationary state of the vehicle is defined as static pitch angle $\theta s$. The static pitch angle $\theta s$, representing the posture of the vehicle when stopped, is also referred to as a standing vehicle posture angle. The static pitch angle $\theta s$ is determined corresponding, for example, to the number of passengers, riding position, weight of baggage in a baggage compartment, and rigidity of front and rear suspensions. In this embodiment, an angle formed between a straight line 12 parallel to the road face 10 and a reference line 22 of the vehicle body 20 is defined as a pitch angle $\theta p$, and the direction in which the reference line 22 points upward (nose-up direction) is defined to be positive.

FIG. 2B illustrates the pitch angle $\theta p$ of the vehicle in the drive mode. The pitch angle $\theta p$ of the vehicle in the drive mode may be understood to be the sum of the static pitch angle $\theta s$ and a dynamic component (also referred to as dynamic pitch angle or pitch angle variation) $\theta d$. The dynamic pitch angle $\theta d$ may contain the following components.

(i) Nose-up upon acceleration of vehicle body, and nose-down upon deceleration
(ii) Change in load (weight balance) of vehicle body, typically due to slope of road face
(iii) Rapid vibration of vehicle body due to irregularity on road face (i) The pitch angle variation upon acceleration or deceleration of the vehicle body, or (ii) the change in the pitch angle due to load change of the vehicle body, which lasts for several seconds, may typically be understood to be DC fluctuation, with a very low frequency component (0.5 Hz or lower).

In contrast, (iii) the vibration of the vehicle body caused by the irregularity on the road face usually falls within the range from approximately 0.5 to 5 Hz, although depending on the rigidity of the suspension or the vehicle weight. The sudden vehicle body vibration typically falls in the range from 0.9 to 2 Hz.

The prior leveling control has removed vibration exceeding approximately 0.5 Hz through a filter, while assuming it as a noise. The prior method has, therefore, not assumed the fast pitch angle variation such as exceeding the cut-off frequency of the filter, out of (i) to (iii), as the matter to be corrected, so that sudden change in the vehicle pitch angle typically due to steep irregularity on the road face during the travel has resulted in sinking down or lifting up of the cut-off line of the low beam.

In contrast, this embodiment actively corrects, rather than removing as a noise, the frequency component exceeding 0.5 Hz (approximately 0.5 to 5 Hz, e.g. 1 to 2 Hz) in the pitch angle variation, which has previously been removed as a noise. In the present specification, the optical axis correction for correcting pitch angle variation during travel is referred to as dynamic leveling.

Referring now back to FIG. 1. The paragraphs below will detail the dynamic leveling, especially a leveling to cope with high-speed pitch angle variation due to irregularity on the road face. The sensor 120 is provided to enable detection of the dynamic component $\theta d$ in the pitch angle $\theta p$, during travel of the vehicle body.

The sensor 120 in this embodiment contains a gyro sensor. The gyro sensor, whose orientation of attachment is freely selectable, is preferably attached so as to align one of the detection axes with the left-right horizontal direction of the vehicle body, thereby generating a detection signal S1 that represents angular velocity $\omega p$ of the rotational movement around the detection axis. The gyro sensor may be triaxial, or monoaxial.

The controller 200 is an electronic control unit (ECU) in which functions related to optical axis correction are integrated, and is assigned to processing regarding the dynamic leveling. The controller 200 may be an ECU dedicated to leveling (also referred to as a leveling ECU), may be an ECU integrated with a controller having other functions, or may be separately embodied in a plurality of ECUs.

The function of the controller 200 may be embodied by software processing, hardware processing, or a combination of software processing and hardware processing. The software processing may be specifically implemented by combining a processor (hardware) such as central processing unit (CPU), micro processing unit (MPU), or microcomputer, with software program executed by the processor (hardware). The controller 200 may be embodied by combination of a plurality of processors (microcontrollers).

The hardware processing is specifically implemented by hardware such as application specific integrated circuit (ASIC), controller IC, or field programmable gate array (FPGA).

The controller 200 detects the dynamic component $\theta d$ in the pitch angle $\theta p$ during travel of the vehicle, by integrating the angular velocity $\omega p$ represented by the detection signal S1. Now, the dynamic component $\theta d$ may be understood as a component, out of the fluctuation of the pitch angle $\theta p$, contained in a frequency band higher than 0.5 Hz. For example, a component contained in a predetermined frequency band, out of the fluctuation of the pitch angle $\theta p$, is determined as the dynamic component to be corrected. The predetermined frequency band may be determined typically within the range from approximately 0.5 Hz to 5 Hz. Which frequency band is to be corrected may only be determined, typically depending on rigidity of the suspension, or the mass of the vehicle body.

The controller 200 shifts the level of the cut-off line CL in the light distribution pattern PTN (level in the vertical direction V, or, the optical axis), with reference to the predetermined level $v_0$, corresponding to the dynamic component $\theta d$ in the pitch angle $\theta p$ of the vehicle body during travel. The prior leveling control has shifted the optical axis only downwards, for the purpose of suppressing glare. In contrast, the dynamic leveling according to this embodiment will actively shift the level of the cut-off line CL, not only downwards, but also actively upwards.

Note, the control of the level of the cut-off line CL encompasses (1) a case where only the level of the cut-off line is shifted up and down, while fixing the bottom end of the light distribution of the lamp, and (2) a case where the level of the lower end of the light distribution of the lamp is shifted up and down, following the level of the cut-off line, in other words, a case where the entire light distribution of the lamp is shifted up and down.

The controller 200 shifts the cut-off line CL downwards, corresponding to a positive dynamic pitch angle θd. In addition, the controller 200 in this embodiment shifts the cut-off line CL actively also upwards, corresponding to a negative dynamic pitch angle θd.

In more detail, the controller 200 shifts the level of the cut-off line CL up and down with reference to the predetermined level $V_0$, so as to cancel the dynamic component θd in the pitch angle θp. The predetermined level $V_0$ represents a coordinate in the vertical direction on which the cut-off line CL should fall, when the variation of the pitch angle θp equals zero.

For example, the controller 200 shifts an ON-OFF boundary 116 in the plurality of pixels PIX of the light emitting element array 112, in order to shift the cut-off line CL up or down on the virtual perpendicular screen 2. By how many pixels the boundary 116 should be shifted, with respect to a certain variation range of the pitch angle θp, may be determined in terms of geometrical optics. Let the shift amount of pixel be Δy.

Figure 3:
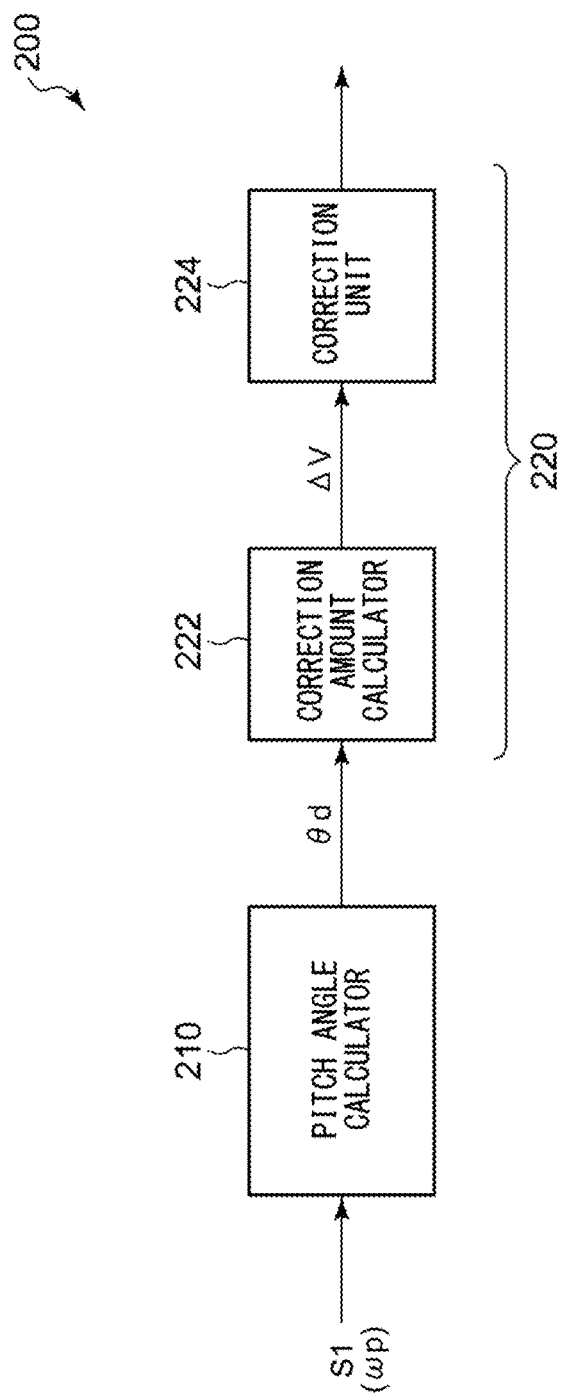
FIG. 3 is a functional block diagram of a controller.

FIG. 3 is a functional block diagram of a controller 200. The controller 200 has a pitch angle calculator 210 and a cut-off line control unit 220.

The pitch angle calculator 210 detects the dynamic component θd in the pitch angle θp, in response to an output of the sensor 120. For example, the pitch angle calculator 210 integrates the angular velocity ωp indicated by the detection signal S1. The pitch angle calculator 210 also optionally subject the integral value to arithmetic processing, to derive the dynamic pitch angle θd. This arithmetic processing may typically include filtering (band limiting), and moving average processing.

The cut-off line control unit 220 shifts up or down the level of the cut-off line CL, in response to the dynamic pitch angle θd. The cut-off line control unit 220 has a correction amount calculator 222 and a correction unit 224. The correction amount calculator 222 calculates the amount of vertical shift (correction amount ΔV) of the cut-off line CL on the virtual perpendicular screen 2, in response to the dynamic pitch angle θd. In this embodiment, the positive correction amount ΔV corresponds to the upward shift of the cut-off line CL, meanwhile the negative correction amount ΔV corresponds to the downward shift of the cut-off line CL. The correction unit 224 controls the light emitting element array 112, so as to shift the cut-off line CL by the correction amount ΔV.

For example, the light emitting element array 112 has an interface through which image data that specifies ON-OFF (or luminance) of the pixels PIX is input. The correction unit 224 in this case may shift up or down the level of the boundary 116 between the on-pixels and the off-pixels contained in the image data, by the number of pixels Δy, corresponding to the correction amount ΔV. That is, the correction unit 224 shifts up or down the level of the cut-off line CL (boundary 116) in the light distribution pattern contained in the image data, with reference to the predetermined level $y_0$, so as to cancel the dynamic component θd in the pitch angle θp. The predetermined level $y_0$ represents a reference level that corresponds to $V_0$.

The correction unit 224 may alternatively shift up or down the level (height) of the boundary between the ON-pixels and the OFF-pixels that corresponds to the lower end of the light distribution pattern, by the number of pixels Δy that corresponds to the correction amount ΔV, in addition to the level (height) of the boundary 116 between the ON-pixels and the OFF-pixels that corresponds to the cut-off line CL. That is, the correction unit 224 may shift the entire light distribution pattern up and down, by the number of pixels Δy that corresponds to the correction amount ΔV.

The structure of the lamp system 100 has been described. Next, operations thereof will be explained.

Figure 4:
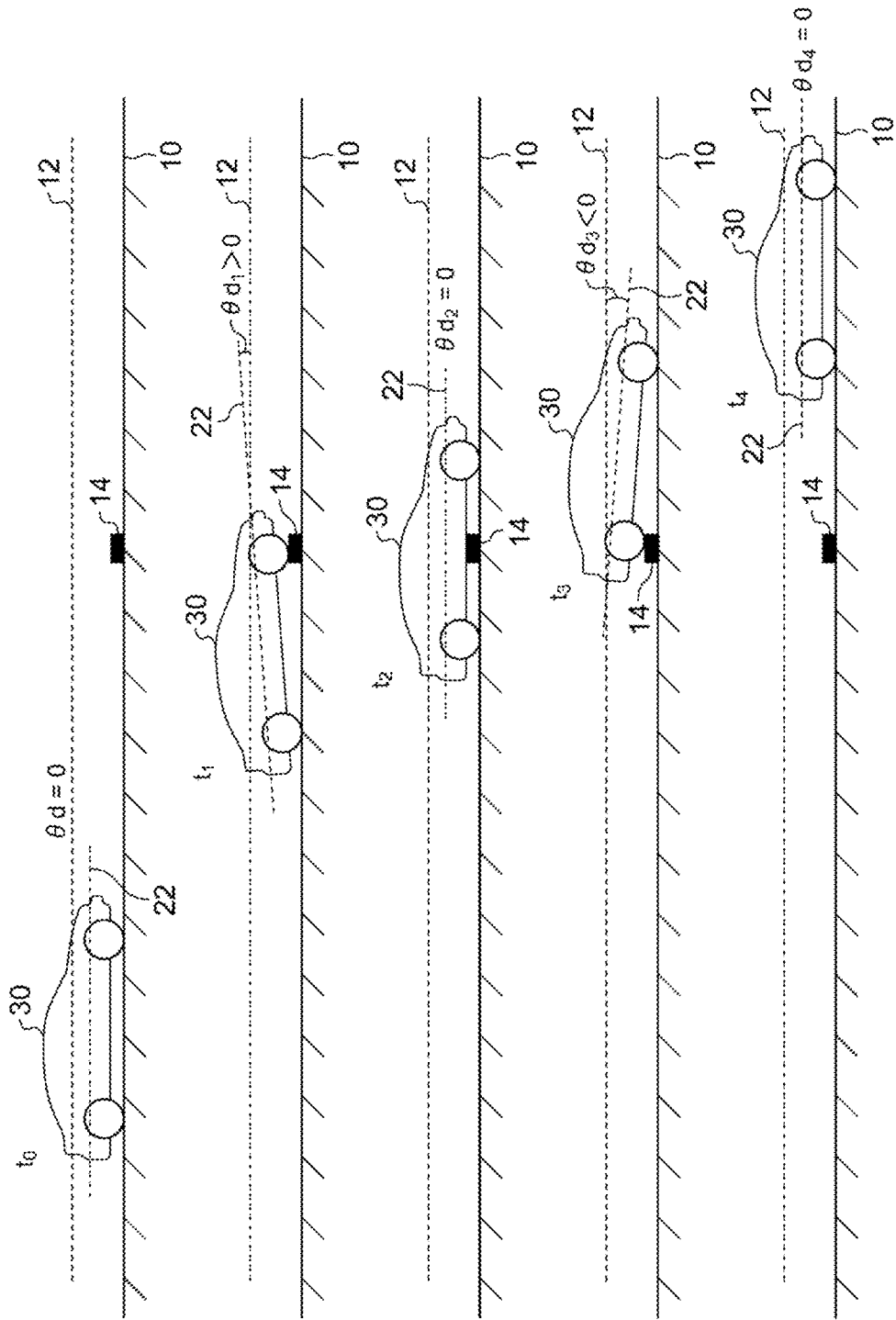
FIG. 4 is a drawing illustrating an exemplary travel scene of a vehicle.

FIG. 4 is a drawing illustrating an exemplary travel scene of a vehicle. In this example, a vehicle 30 travels from left to right in the drawing, while getting over a step 14 on the road face 10. FIG. 4 illustrates posture of the vehicle 30 at a plurality of times $t_0$ to $t_4$. The individual times $t_0$ to $t_4$ stand for the following states.

Time $t_0$: State of travel in front of step 14
Time $t_1$: State of front wheel run on step 14
Time $t_2$: State of front wheel climbed over step 14
Time $t_3$: State of rear wheel run on step 14
Time $t_4$: State of rear wheel climbed over step 14

The dynamic pitch angle θd at each of the times $t_0$, $t_2$, and $t_4$ equals 0. The dynamic pitch angle θd at time $t_1$ has a positive value $θd_1$, and the dynamic pitch angle θd at time $t_2$ has a negative value $θd_3$.

Figure 5:
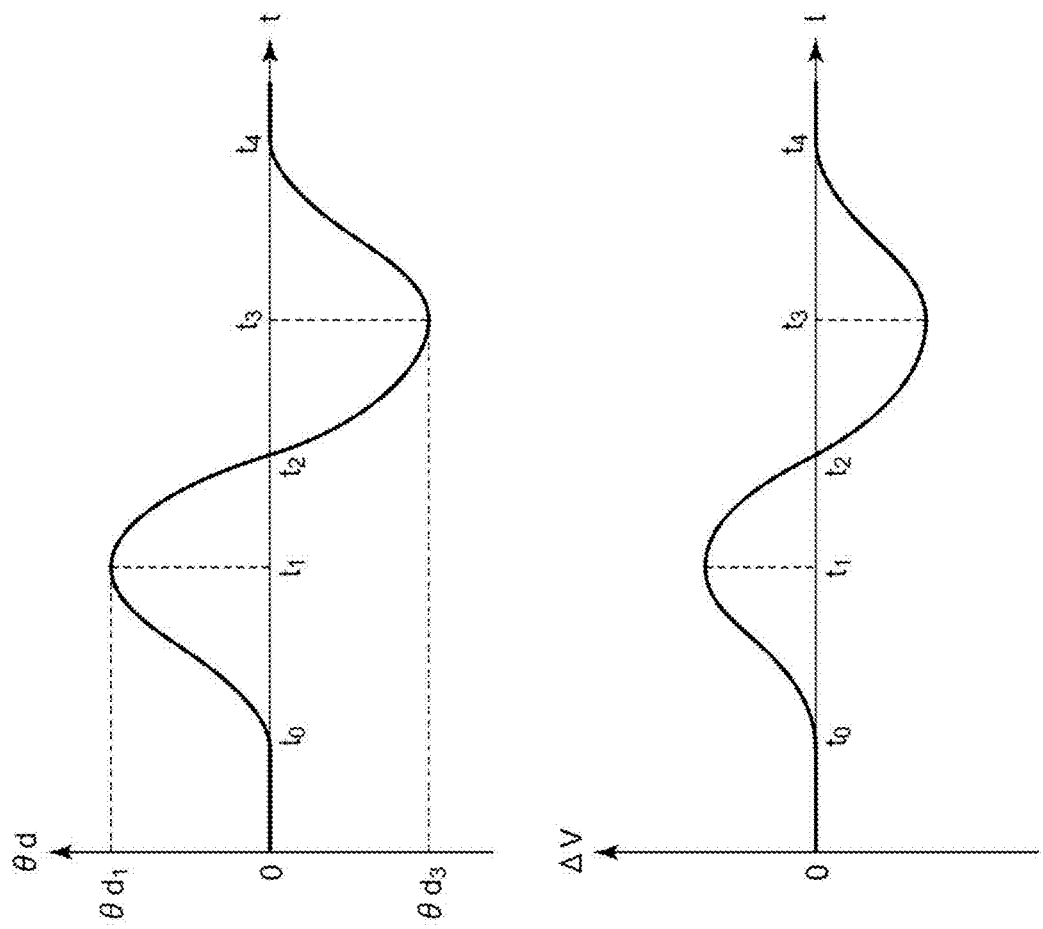
FIG. 5 is a drawing illustrating a waveform of dynamic pitch angle $\theta d$ and a waveform of correction amount $\Delta V$, corresponded to the travel scene illustrated in FIG. 4.

FIG. 5 is a drawing illustrating a waveform of dynamic pitch angle θd and a waveform of correction amount ΔV, corresponded to the travel scene illustrated in FIG. 4. As illustrated in FIG. 4, the dynamic pitch angle θd swings in the positive direction, then swings in the negative direction, and finally returns to 0.

The correction amount ΔV is generated corresponding to such variation of the dynamic pitch angle θd.

Figure 6:
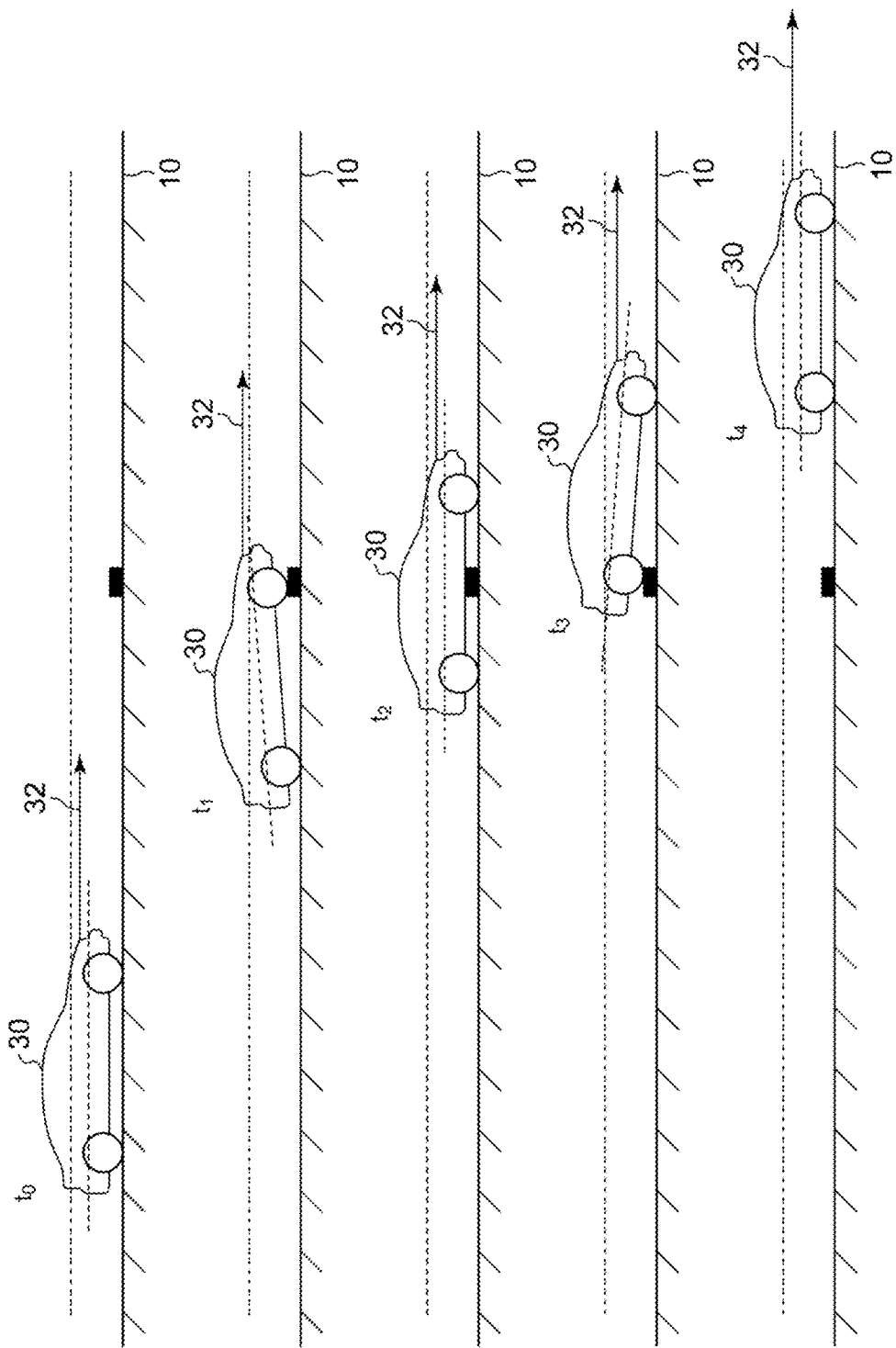
FIG. 6 is a drawing illustrating lamp beams corresponded to a cut-off line of the light of the headlamp, in the travel scene illustrated in FIG. 4.

FIG. 6 is a drawing illustrating light beams corresponded to the cut-off line of the lamp beam of the headlamp, in the travel scene illustrated in FIG. 4. A beam 32 of the lamp beam may be kept at a constant angle away from the road face 10, with use of the adaptive light driving beam control in compliance with the dynamic pitch angle θd.

The operation of the lamp system 100 has been described. The lamp system 100 can prevent glare by shifting the cut-off line downwards, when the vehicle 30 sinks in the rear part at time $t_1$ as illustrated in FIG. 6. Meanwhile, the lamp system 100 can prevent a far field of view from being looked dark, by shifting the cut-off line upwards, when the vehicle 30 sinks down in the front part at time $t_3$ as illustrated in FIG. 6.

In addition, with the control made adaptive to dynamic changes in the pitch angle θ of the vehicle body, the level of the cut-off line may be kept constant on a virtual perpendicular screen ahead of the vehicle, even if the vehicle 30 causes front-rear vibration (pitching), thereby preventing an object ahead of the vehicle from being looked bright and dark, and thus successfully providing an improved field of view.

The static pitch angle θs may be understood to be a reference value of the pitch angle θp, and the dynamic pitch angle θd may be understood as a dynamic deviation of the pitch angle θp from the reference value. The controller 200 may therefore be understood to control the high-definition lamp unit 110, so as to keep a constant angle between the beam 32 that corresponds to the cut-off line of the lamp beam, and the road face 10, corresponding to the deviation θd.

Paragraphs below will explain an exemplary control of light distribution adaptive to changes in the pitch angle θp, by the controller 200.

Figure 7A:
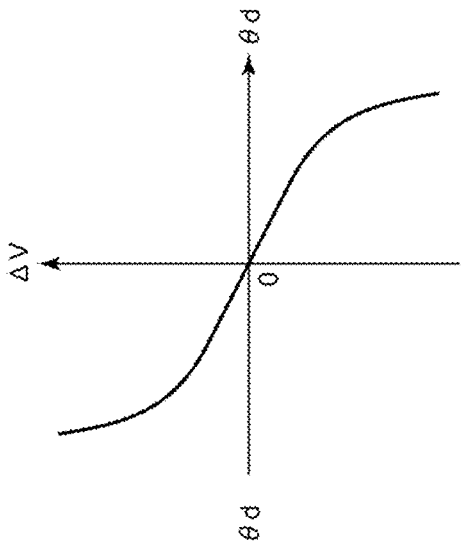
FIG. 7A to FIG. 7C are drawings illustrating exemplary relations (control characteristic) between the dynamic pitch angle $\theta d$ and the correction amount $\Delta V$.
Figure 7B:
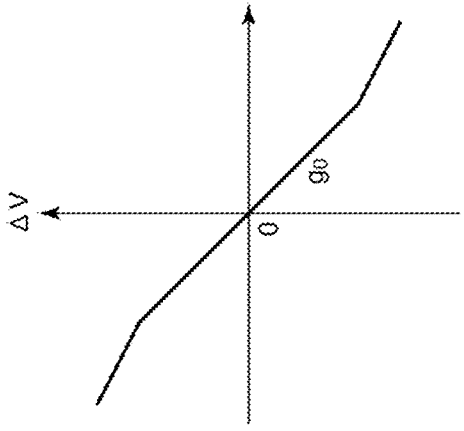
Figure 7C:
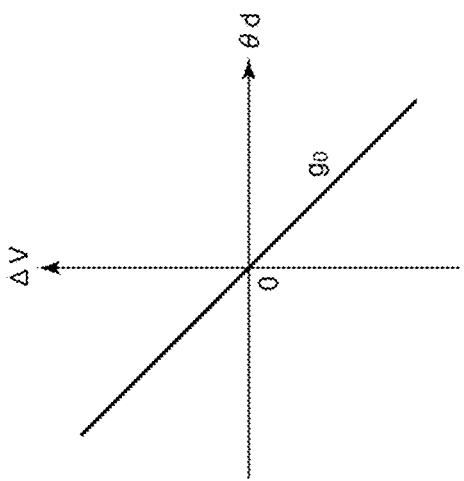

FIGS. 7A to 7C are drawings illustrating exemplary relations (control characteristic) between the dynamic pitch angle θd and the correction amount ΔV.

Letting now the amount of correction ΔV be the amount of shift of the cut-off line CL on the virtual perpendicular screen, and letting the distance up to the virtual perpendicular screen be L, it suffices that Equation (1) holds.

$$\Delta V = L \times \tan\theta d \quad (1)$$

If θd≈0, then tan θd≈θd, so we obtain Equation (2).

$$\Delta V \approx L \times \theta d \quad (2)$$

Hence, the correction amount ΔV may be most simply given, as illustrated in FIG. 7A, by a linear function having a proportional constant derived from the distance L (referred to as reference gain $g_0$), multiplying the dynamic pitch angle θd. In a case where the image data to be supplied to the light emitting element array 112 is corrected as described above, the boundary 116 that corresponds to the cut-off line on the image data is shifted up or down, so that the correction amount ΔV is obtainable. The shift amount Δy of the pixel in this case may be determined in consideration of the design of the illumination optical system 114 with use of a function f( ) derivable in terms of geometrical optics, where a relation Δy=f(θd) holds. If the illumination optical system 114 is a simple one, the f( ) may be approximated by a linear function, as expressed by Equation (3).

$$\Delta y = \alpha \cdot \theta d \quad (3)$$

Meanwhile, if the illumination optical system 114 has complexity such as containing a reflecting mirror with a hyperbolic paraboloid, elliptic paraboloid, rotating paraboloid, or free paraboloid, the correction amount ΔV may be specified by a polyline with respect to the dynamic pitch angle θd, as illustrated in FIG. 7B.

Alternatively, even with use of a simple optical system, the control characteristic as illustrated in FIG. 7B may be employable, for the purpose of reducing the correction amount ΔV with respect to the unit variation of the dynamic pitch angle θd, in a region where the variation amount (absolute value of θd) is large. This case can suppress glare, when control delay occurs in a situation that the nose-dive is immediately followed by the nose-up.

Meanwhile, for the illumination optical system 114 having a complexity such as containing the reflecting mirror with an elliptic paraboloid or a free paraboloid, a more intricate control characteristic may be specified as illustrated in FIG. 7C.

The upward shift of the cut-off line may be invalidated, corresponding to the travel situation. In an exemplary case where the dynamic pitch angle θd includes a frequency component exceeding the response rate of the controller 200, the glare may be suppressed by invalidating the upward shift of the cut-off line.

Alternatively, not only the upward shift, but also the downward shift of the cut-off line may be invalidated. A case where irregularity continues on the road face (for example, 3 seconds or longer in a temporal sense), the road face is assumed to be a special one (dirt course, unpaved mountain road, etc.), rather than usual road for driving. In a case where sharp pitch angle variation continues for a predetermined duration (3 seconds) or longer, the pitch angle control may be fixed to the one having been acquired during the stop or stable travel mode. The cut-off line, when returned back to the previous state, is preferably returned gradually over several seconds, rather than returned promptly. In a case with use of the high-definition lamp unit 110 that can control the intensity distribution in multiple gradations, the cut-off line is preferably returned gradually while producing blurring or gradation.

(Asymmetrical Vertical Control)

The process of actively shifting up the optical axis upwards upon nose-diving brings about an effect of maintaining a far field of view. On the other hand, this would give glare to a nearby traffic participant, in case of control delay, or unexpected change in the road face.

Figure 8:
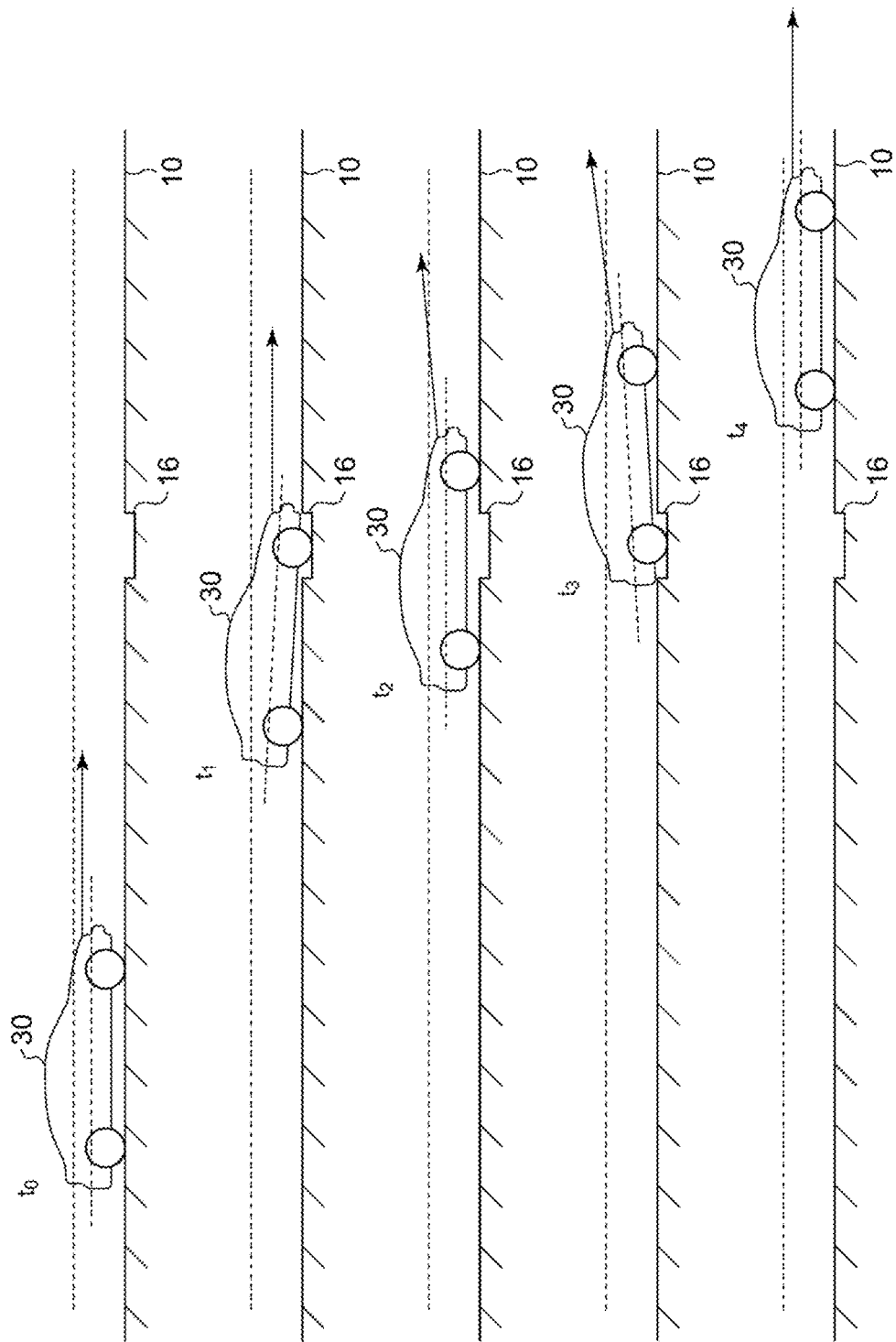
FIG. 8 is a drawing illustrating glare possibly resulted from correction of the optical axis upon nose-dive.

FIG. 8 is a drawing illustrating glare possibly resulted from correction of the optical axis upon nose-dive. In this example, the vehicle 30 travels from left to right in the drawing, while passing over a dent 16 on the road face 10. FIG. 4 illustrates posture of the vehicle 30 at a plurality of times $t_0$ to $t_4$. The individual times $t_0$ to $t_4$ stand for the following states.

Time $t_0$: State of travel in front of dent 16
Time $t_1$: State of front wheel fell in dent 16
Time $t_2$: State of front wheel passed recess 16
Time $t_3$: State of rear wheel fell in dent 16
Time $t_4$: State of rear wheel passed recess 16

When the vehicle causes nose-dive at time $t_1$, the level of the cut-off line is corrected so as to direct the optical axis upwards. At subsequent time $t_2$, the posture of the vehicle returns to the normal one, which is represented by θd=0. The controller 200 in this case tries to return the cut-off line to the original predetermined level $v_0$. However in case of control delay, the cut-off line cannot fully return back to the predetermined level $v_0$, and will remain above the predetermined level $v_0$. This would cause illumination of the lamp beam above the horizontal line, and would cause glare.

Further in the nose-up state at time $t_3$, the controller 200 tries to correct the level of the cut-off line below the predetermined level $v_0$, so as to direct the optical axis downwards. Also in this case if associated with control delay, the cut-off line cannot fully fall down to the target level that corresponds to the current posture, possibly causing the lamp beam illuminated above the horizontal line, and causing glare.

The problem, having described with reference to FIG. 8, may be solved by an asymmetrical vertical control described below.

In the examples of FIGS. 7A to 7C, the same control characteristic was applied to both cases where the dynamic pitch angles θd are positive and negative, in other words, to both cases where the cut-off line CL shifts upwards from the predetermined level, and downwards from the predetermined level. In contrast, the asymmetrical vertical control adopts asymmetry, corresponding to the sign (direction) of the dynamic pitch angle θd.

That is, the control characteristic of the cut-off line CL may differ between the cases where the dynamic pitch angles θd are positive and negative, in other words, between the cases where the cut-off line CL shifts upwards from the predetermined level, and downwards from the predetermined level. The control characteristic herein relates to correlation between the dynamic pitch angle θd and the correction amount ΔV, which is exemplified by the aforementioned function f( ), and parameters (gain and order) that define the function f( ).

Figure 9A:
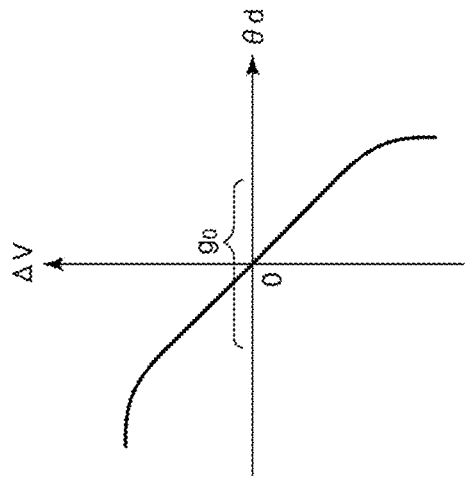
FIG. 9A to FIG. 9C are drawings illustrating exemplary relations (control characteristic) between the dynamic pitch angle $\theta d$ and the correction amount $\Delta V$.
Figure 9B:
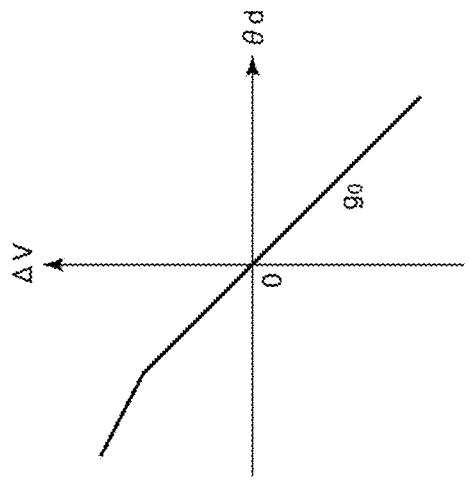
Figure 9C:
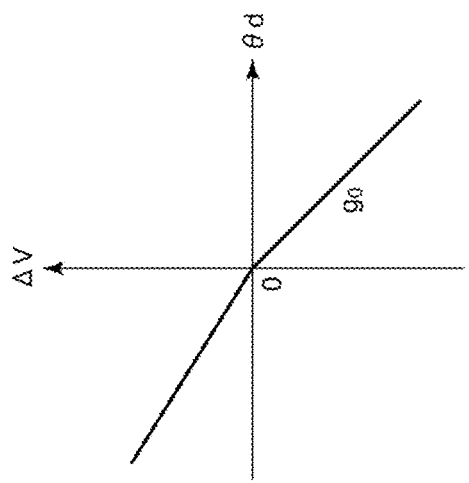

FIGS. 9A to 9C are drawings illustrating exemplary relations (control characteristic) between the dynamic pitch angle θd and the correction amount ΔV. The example illustrated in FIG. 9A has the control characteristic that follows a linear function similarly to as in FIG. 7A, but with different gains (inclination) for θd>0 (nose-up) and θd<0 (nose-dive). In other words, given the dynamic pitch angle θd having the same absolute value with different signs, the correction amount ΔV may be relatively large if θd>0, meanwhile the correction amount ΔV may be relatively small if θd<0.

More specifically, in the region of θd>0, the control characteristic has a slope (reference gain $g_0$) derived from distance L, as expressed by Equation (2). This can reliably prevent glare.

On the other hand, in the region of θd<0, the slope is smaller than the slope in the region of θd>0 which represents the reference gain $g_0$. That is, in case of nose-dive, the amount of shifting the optical axis upwards is suppressed. This case can suppress glare possibly exerted on a nearby traffic participant, when control delay occurs in a situation that the nose-dive is immediately followed by the nose-up. The problem having been described with reference to FIG. 8 may thus be solved.

Figure 10:
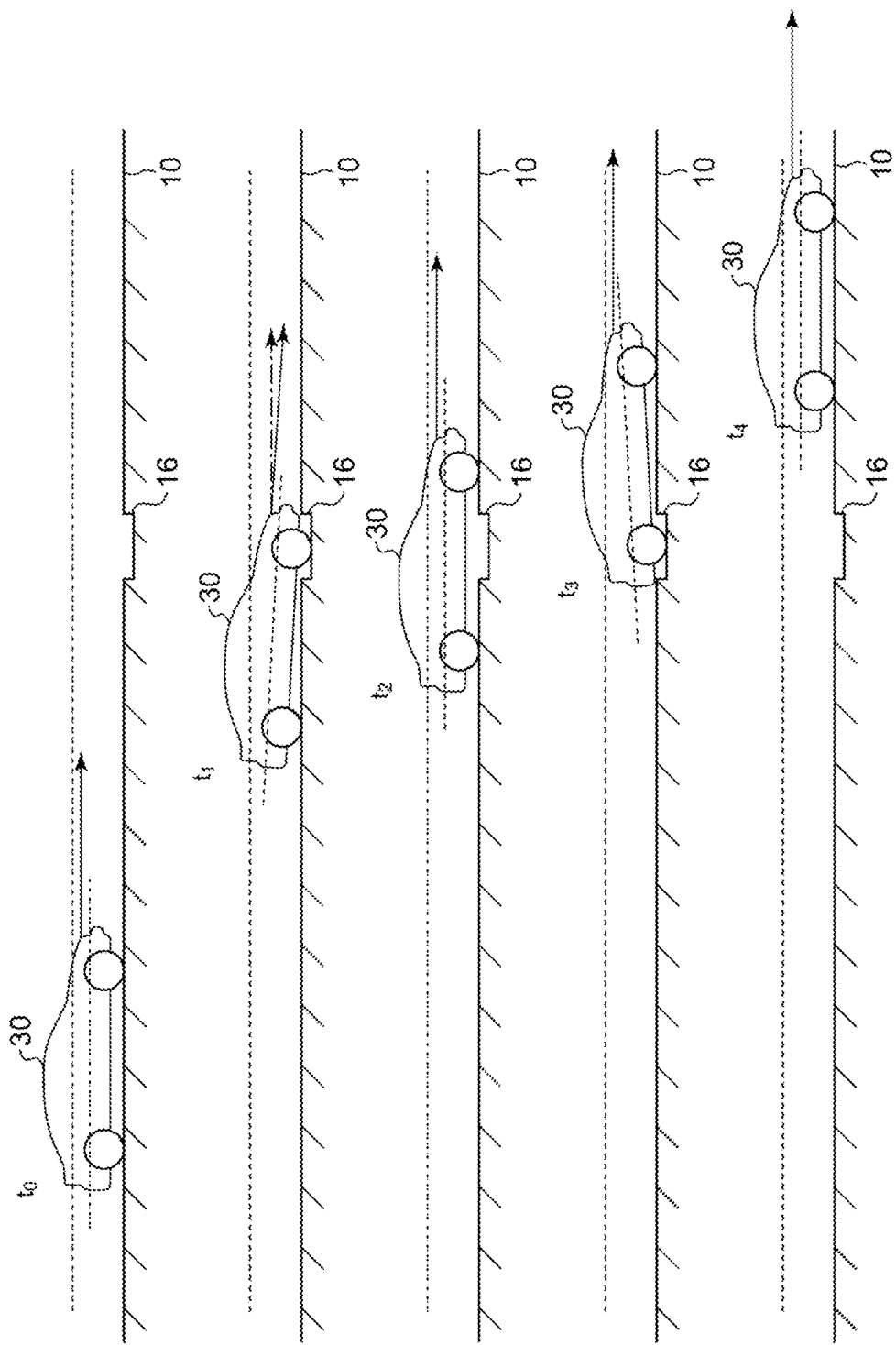
FIG. 10 is a drawing illustrating correction of optical axis, according to control characteristic illustrated in FIG. 9A.

FIG. 10 is a drawing illustrating correction of optical axis, with reference to control characteristic illustrated in FIG. 9A. FIG. 10 illustrates the control characteristic of FIG. 9A adopted to the travel scene same as in FIG. 8. When the vehicle causes nose-dive at time $t_1$, the level of the cut-off line is corrected so as to direct the optical axis upwards. Now θd<0 holds, then the correction amount ΔV becomes smaller than the correction amount in the case of FIG. 8. A dash-dot line represents the optical axis in FIG. 8, and a solid line represents the optical axis derived from the control characteristic in FIG. 9A.

At subsequent time $t_2$, the posture of the vehicle returns to the normal one, which is represented by θd=0. The controller 200 in this case tries to return the cut-off line to the original predetermined level $v_0$. Since the correction amount ΔV in the just-preceding nose-dive is suppressed low, so that the cut-off line can return to the predetermined level $v_0$ even in case of control delay. This can keep the lamp beam below the horizontal line, thus suppressing glare.

Referring now back to FIG. 9B. The example of FIG. 9B has a negative threshold value $θ_{TH}$ specified therein, so that the slope represents the reference gain $g_0$ in the region of θd>$θ_{TH}$. On the other hand, in the region of θd<$θ_{TH}$, the slope is smaller than the slope that represents the reference gain $g_0$.

Hence upon shallow nose-dive, the far field of view may be maintained by correcting the optical axis with a basic gain. On the other hand, upon deep nose-dive, the amount of upward shift of the optical axis is suppressed. This case can suppress glare possibly exerted on a nearby traffic participant, when control delay occurs in a situation that the nose-dive is immediately followed by the nose-up. The problem described with reference to FIG. 8 may thus be solved.

In the example of FIG. 9C, the slope represents the reference gain $g_0$ in the region of θd≈0, whereas the slope increases in the region of θd>0, as the variation amount (absolute value) increases. This directs the optical axis downwards more largely than theoretically required, in a situation with large nose-up. This can more reliably suppress glare.

Conversely, the slope decreases in the region of θd<0, as the variation amount (absolute value) increases. This directs the optical axis upwards to a lesser extent than theoretically required, in a situation with deep nose-dive. This can suppress glare possibly exerted on a nearby traffic participant, when control delay occurs in a situation that the posture changes to nose-up immediately thereafter. The problem described with reference to FIG. 8 may thus be solved.

Assuming now a transfer function H(s) that involves the dynamic pitch angle θd as an input and the correction amount ΔV as an output, the transfer function can contain a filter element, so that the control characteristic, or a filter characteristic, may differ between the cases where the cut-off line CL shifts upwards from the predetermined level, and downwards from the predetermined level.

Figure 11A:
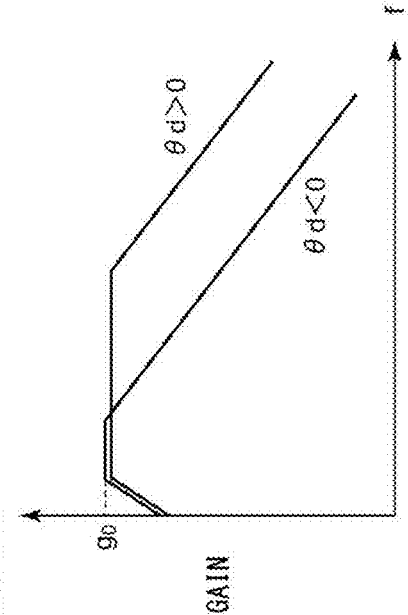
FIG. 11A to FIG. 11D are drawings illustrating exemplary relations (control characteristic) between the dynamic pitch angle $\theta d$ and the correction amount $\Delta V$.

FIG. 11A to FIG. 11D are drawings illustrating exemplary relations (control characteristic) between the dynamic pitch angle θd and the correction amount ΔV. In FIG. 11A, frequency characteristic (cut-off frequency) is the same in both regions of θd>0 and θd<0, with a difference only in the gain g.

Figure 11B:
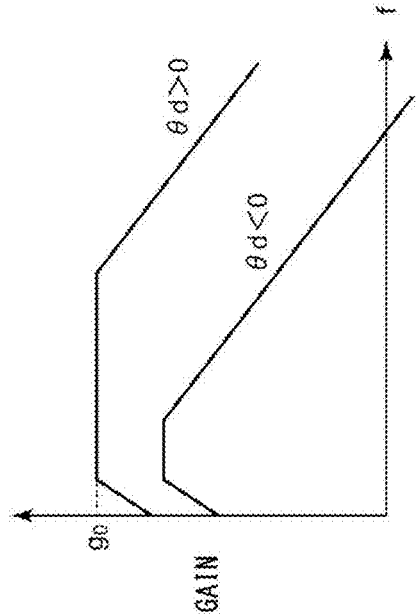

In FIG. 11B, the gain equals to the reference gain $g_0$ in both regions of θd>0 and θd<0, with different frequency characteristics. More specifically, the dynamic pitch angle θd is corrected over a wider frequency range in the region of θd>0 (nose-up), thus reliably preventing glare. Meanwhile in the region of θd<0 (nose-dive), the frequency band over which the dynamic pitch angle θd is corrected is narrowed. This can reduce the risk of glare due to control delay.

Figure 11C:
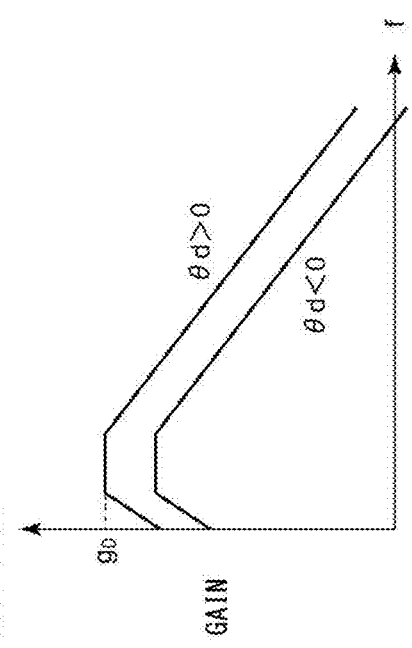

Also in FIG. 11C, the gain equals to the reference gain $g_0$ in both regions of θd>0 and θd<0 similarly to as in FIG. 11B, but with different frequency characteristics. In FIG. 11C, the frequency band over which the dynamic pitch angle θd is corrected is narrowed in the region of θd<0 (nose-dive), but with the band for correction shifted to a higher region than in FIG. 11B.

Figure 11D:
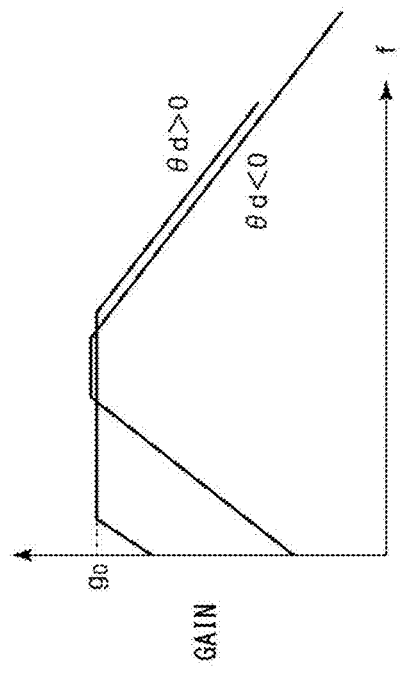

In FIG. 11D, both of the gain g and the frequency characteristic are different for the regions of θd>0 and θd<0.

In another approach, the speed at which the cut-off line CL is shifted up and down corresponding to the posture of the vehicle body may be changed. More specifically, the speed of upward shifting of the cut-off line may be slower than the speed of downward shifting of the cut-off line. This makes it less likely to cause glare, after upward correction of the cut-off line CL.

Alternatively, the upward shift of the cut-off line may be invalidated, corresponding to the travel situation. In an exemplary case where the dynamic pitch angle d includes a frequency component exceeding the response rate of the controller 200, the glare may be suppressed by invalidating the upward shift of the cut-off line.

Alternatively, not only the upward shift, but also the downward shift of the cut-off line may be invalidated. A case where irregularity continues on the road face (for example, 3 seconds or longer in a temporal sense), the road face is assumed to be a special one (dirt course, unpaved mountain road, etc.), rather than usual road for driving. In a case where sharp pitch angle variation continues for a predetermined duration (3 seconds) or longer, the pitch angle control may be fixed to the one having been acquired during the stop or stable travel mode. The cut-off line, when returned back to the previous state, is preferably returned gradually over several seconds, rather than returned promptly. In a case with use of the high-definition lamp unit 110 that can control the intensity distribution in multiple gradations, the cut-off line is preferably returned gradually while producing blurring or gradation.

In a case where the high-definition lamp unit 110 can create a multi-gradation light distribution, the controller 200 may change the intensity distribution of the light distribution (illuminance distribution), in addition to the shifting of the cut-off line (leveling control).

Figure 12A:
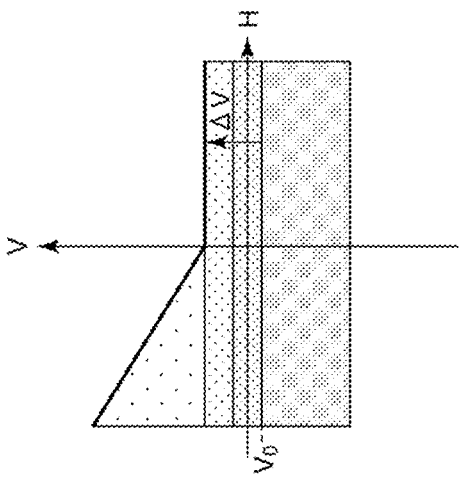
FIG. 12A to FIG. 12C are drawings illustrating exemplary control of an intensity distribution of light distribution.
Figure 12B:
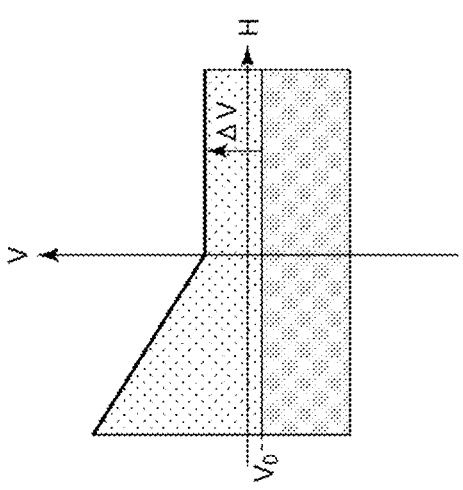
Figure 12C:
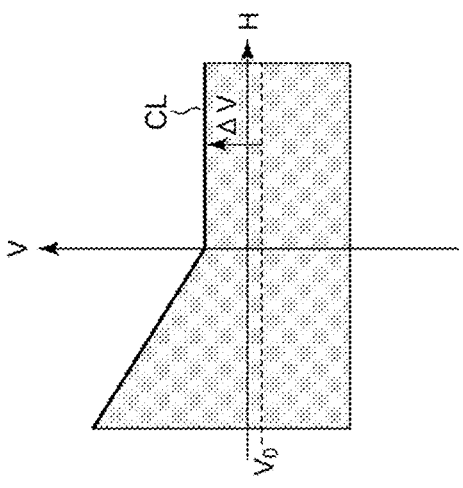

FIG. 12A to FIG. 12C are drawings illustrating exemplary control of an intensity distribution of light distribution. FIG. 12A exemplifies a most standard light distribution control, in which only the cut-off line CL is shifted upwards, with the illuminance kept substantially constant. Note that FIGS. 12A to 12C depict the illuminance by hatching with varied density, wherein the larger the density, the higher the illuminance.

In the example of FIG. 12B, when the cut-off line CL resides above the predetermined level $v_0$, the controller 200 lowers the illuminance in the region above the predetermined level $v_0$, to a level lower than the illuminance (prescribed value) in FIG. 12A. This makes glare less likely to occur, while maintaining the driver's far field of view.

In the example of FIG. 12C, when the cut-off line CL resides above a predetermined level $v_0$, the light distribution has an intensity distribution in which the illuminance in the region above the predetermined level $V_0$ is gradated so as to be gradually dimmed upwards. This makes glare less likely to occur, while maintaining the driver's far field of view.

Modified Example 1

A modified example derived from Embodiment 1 will be described.

Modified Example 1.1

The embodiment has detected the dynamic component of the pitch angle with use of the gyro sensor. The present disclosure is, however, not limited thereto. For example, the dynamic component of the pitch angle may be detected with use of a combination of a front vehicle height sensor arranged on the front suspension of the vehicle body, and a rear vehicle height sensor arranged on the rear suspension of the vehicle body.

Modified Example 1.2

The embodiment has constituted the high-definition lamp unit 110 with the light emitting element array 112. The present disclosure is, however, not limited thereto. For example, the high-definition lamp unit 110 may contain a light source that generates light with a substantially flat intensity distribution, and a spatial light modulator that spatially patterns the emitted light of the light source. The spatial light modulator is exemplified by digital micromirror device (DMD), and liquid crystal device.

Modified Example 1.3

The technique by which the controller 200 shifts the level of the cut-off line CL up and down is not limited to that described in the embodiments. For example, the light emitting element array 112 may have a pixel shifting function. In this case, the light emitting element array 112 may only be given the image data as the reference, and the pixel shift amount $\Delta y$.

Modified Example 1.4

Control of the optical axis, that is, control of the height of the cut-off line is not limited to pixel control of the high-definition lamp unit 110 (electronic leveling). For example, an ordinary low beam unit may be structured to be controllable with a high-speed leveling actuator, thus making it possible to control the height of the cut-off line by changing the inclination of the low beam unit (referred to as mechanical leveling). Alternatively, the position of the light emitting element array 112 may be structured to allow mechanical shifting.

Embodiment 2

Figure 13:
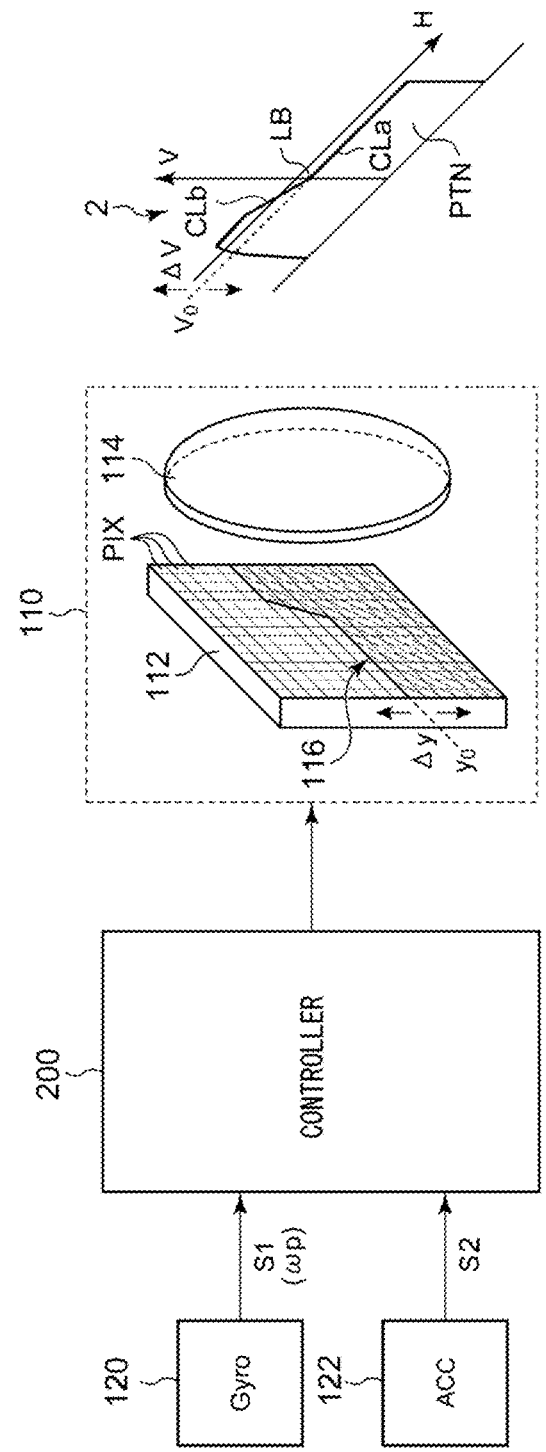
FIG. 13 is a block diagram illustrating a lamp system of embodiment 2.

FIG. 13 is a block diagram illustrating a lamp system 100 of Embodiment 2. The lamp system 100 is a headlamp that is mounted on an automobile, and illuminates a field of view ahead of the vehicle with light. The automobile can vary the angle of inclination in the front-rear direction, corresponding to the front-rear weight balance. The front-rear inclination angle corresponds to rotation around a horizontal axis that extends in the left-right direction of the vehicle body, and is referred to as a pitch angle $\theta p$.

The lamp system 100 has a function (auto leveling function) that automatically adjusts the optical axis of the headlamp in the pitch direction, corresponding to the pitch angle $\theta p$.

The lamp system 100 has a high-definition lamp unit 110, a first sensor 120, a second sensor, and a controller 200.

In this embodiment, the high-definition lamp unit 110 is an adaptive driving beam lamp which is structured to illuminate a part of, or the entire part of a low beam region, with light. The high-definition lamp unit 110 may alternatively cover a part/all of the high beam region, in addition to a part/all of the low beam region. The high-definition lamp unit 110 contains a plurality of individually controllable pixels PIX, and emits lamp beam with light distribution corresponded to states of the pixels PIX. The high-definition lamp unit 110 typically includes a light emitting element array 112, and an illumination optical system 114. The light emitting element array 112 usable here may be an LED array.

The luminance of each pixel PIX may be controllable in two gradations of ON and OFF, or may be controllable in multiple gradations. The pixels, when structured to be controllable in two gradations of ON and OFF, may alternatively be expressed in multiple gradations with the aid of PWM dimming, by which the individual pixels PIX are switched at high speed, while varying the temporal ratio (duty cycle) between the on-time and the off-time.

The illumination optical system 114 projects the output light from the light emitting element array 112, to the front of the vehicle. The illumination optical system 114 may be a lens optical system, a reflection optical system, or a combination thereof.

FIG. 13 illustrates a virtual perpendicular screen 2. The virtual perpendicular screen 2 is assumed to be a coordinate system with reference to the road face. The virtual perpendicular screen 2 may be 10 m, or 25 m away from the vehicle (lamp). On the virtual perpendicular screen 2, a light distribution pattern PTN is created with the lamp beam of the high-definition lamp unit 110. The light distribution pattern PTN is an intensity distribution of the lamp beam seen on the virtual perpendicular screen 2, which corresponds to an on/off pattern of the plurality of pixels PIX of the light emitting element array 112. Note that the correspondence between the position of a certain pixel, with an illumination area on the virtual perpendicular screen 2 ascribed to the pixel, is determined by the illumination optical system 114, and may be occasionally given in a mirror image relation (left-right inversion), up-down inversion, or up-down and left-right inversion.

The light distribution pattern PTN contains a cut-off line CL. In this example, the light distribution pattern PTN contains a horizontal cut-off line CLa and an oblique cut-off line CLb, which intersect at an elbow point LB.

In this embodiment, the controller 200 corrects the optical axis of the low beam in the pitch angle direction, corresponding to fluctuation of the pitch angle $\theta p$ caused by various factors during stop and travel of the vehicle.

For example, the controller 200 shifts an ON-OFF boundary 116 in the plurality of pixels PIX of the light emitting element array 112, in order to shift the cut-off line CL up or down on the virtual perpendicular screen 2. By how many pixels the boundary 116 should be shifted, with respect to a certain variation range of the pitch angle $\theta p$, may be determined in terms of geometrical optics. Let the shift amount of pixel be $\Delta y$.

In this embodiment, the controller 200 subjects, similarly to as in Embodiment 1, the frequency component exceeding 0.5 Hz in the pitch angle variation, which has previously been removed as a noise, to the dynamic leveling.

Furthermore, in the present embodiment, the controller 200 also corrects the optical axis according to the static pitch angle (standing vehicle posture angle) $\theta s$ illustrated in FIG. 2A. More specifically, the controller controls to direct the optical axis of the lamp downwards, corresponding to change in the static load of the vehicle in a stop mode. This is referred to as static leveling. The static leveling has been practiced in the prior vehicle lamp, with use of a G sensor (acceleration sensor) or a vehicle height sensor.

For implementation of the static leveling and the dynamic leveling, it is necessary to accurately detect high-speed changes in the pitch angle, and static or low-speed changes.

For accurate detection of the pitch angle $\theta p$ in this embodiment, the first sensor 120 and the second sensor 122 are provided.

The first sensor 120 is provided mainly to enable detection of the dynamic component $\theta d$ in the pitch angle $\theta p$ of the vehicle body during travel. The first sensor 120 contains a gyro sensor. The gyro sensor, whose orientation of attachment is freely selectable, is preferably attached so as to align one of the detection axes with the left-right horizontal direction of the vehicle body, thereby generating a first detection signal S1 that represents angular velocity $\omega p$ of the rotational movement around the detection axis. The gyro sensor may be triaxial, or monoaxial.

The second sensor 122 is an acceleration sensor (G sensor). The second sensor 122 outputs a detection signal S2 that contains accelerations $\alpha_x$, $\alpha_y$, and $\alpha_z$ for the three axes, respectively. During a stationary state or a uniform motion of the vehicle, a composite vector of the accelerations $\alpha_x$, $\alpha_y$, and $\alpha_z$ along the three axes is directed to the direction of gravity. For an acceleration motion of the vehicle, a composite vector of the accelerations $\alpha_x$, $\alpha_y$, and $\alpha_z$ of the three axes gives a composite vector of gravity and an acceleration vector of the vehicle body.

The first sensor 120 and the second sensor 122 may be a six-axis sensors in which an acceleration sensor and a gyro sensor are integrated.

The controller 200 is an electronic control unit (ECU) in which functions related to optical axis correction are integrated, and is assigned to processing regarding the static leveling and the dynamic leveling. The controller 200 may be an ECU dedicated to leveling (also referred to as a leveling ECU), may be an ECU integrated with a controller having other functions, or may be separately embodied in a plurality of ECUs.

The function of the controller 200 may be embodied by software processing, hardware processing, or a combination of software processing and hardware processing. The software processing may be specifically implemented by combining a processor (hardware) such as central processing unit (CPU), micro processing unit (MPU), or microcomputer, with software program executed by the processor (hardware). The controller 200 may be embodied by combination of a plurality of processors (microcontrollers).

The hardware processing is specifically implemented by hardware such as application specific integrated circuit (ASIC), controller IC, or field programmable gate array (FPGA).

The controller 200 detects the pitch angle $\theta p$ of the vehicle, in response to the detection signal S1 generated by the first sensor 120 and the second detection signal S2 generated by the second sensor 122, and controls the height of the cut-off line of the light distribution corresponding to the pitch angle $\theta p$. As has been illustrated in FIG. 2A and FIG. 2B, the pitch angle $\theta p$ contains static pitch angle $\theta s$ (standing vehicle posture angle) and dynamic pitch angle $\theta p$.

An exemplary structure and processing of the controller 200 will be described.

Example 1

Figure 14:
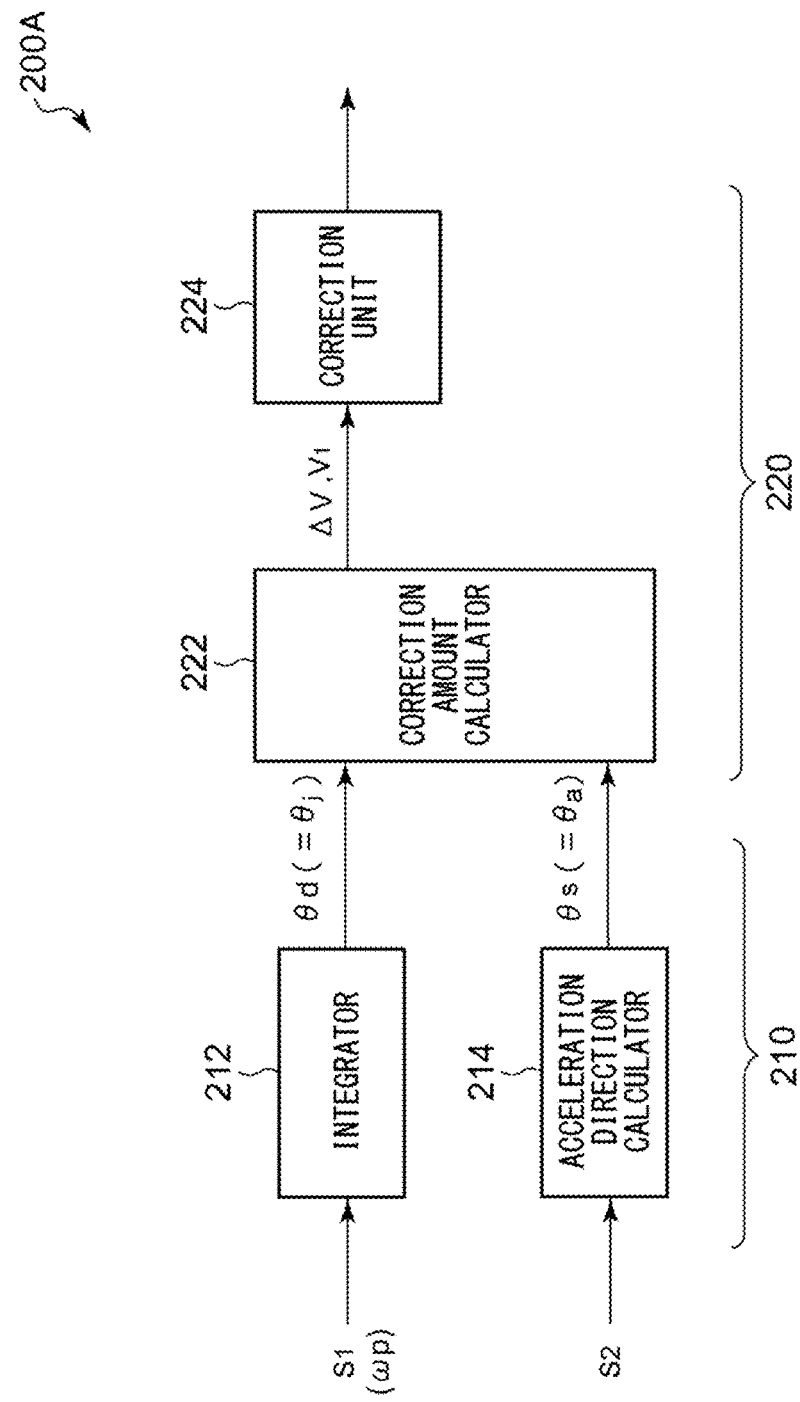
FIG. 14 is a functional block diagram of a controller of Example 1.

FIG. 14 is a functional block diagram of a controller 200A of Example 1. The controller 200A has a pitch angle calculator 210 and a cut-off line control unit 220.

The pitch angle calculator 210 generates angle information necessary for optical axis correction (leveling control), that is, the pitch angle $\theta p$, from the two detection signals S1 and S2.

The pitch angle calculator 210 contains an integrator 212 and an acceleration direction calculator 214. The integrator 212 calculates a first pitch angle $\theta j$ by integrating the angular velocity $\omega p$ represented by the first detection signal S1.

The acceleration direction calculator 214 calculates a second pitch angle $\theta a$ that represents the acceleration direction $\alpha$, from accelerations $\alpha_x$, $\alpha_y$, and $\alpha_z$ represented by the second detection signal S2.

Figure 15:
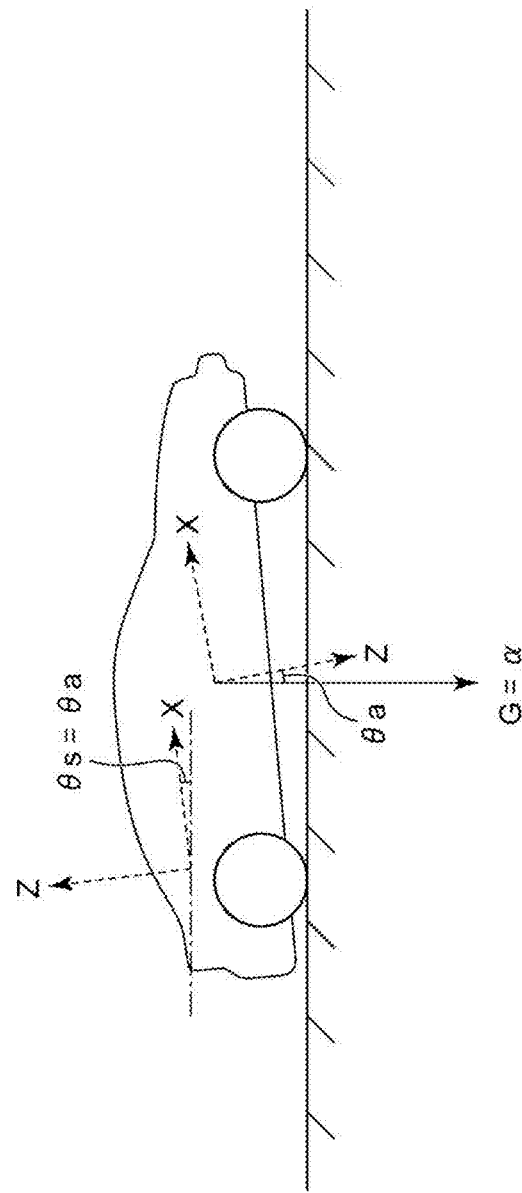

FIG. 15 is a drawing illustrating the second pitch angle $\theta a$. Consider now the vehicle body in the stop mode or uniform motion. The acceleration direction $\alpha$ detected by the acceleration direction calculator 214 coincides with the gravity direction G of the vehicle in a stop mode or uniform motion.

For easy understanding, the x-, y-, and z-axes of the acceleration sensor are defined in parallel to X-, Y-, and Z-axes of the vehicle body, respectively. The X-axis of the vehicle body is defined to align with the travel direction, the Y-axis with the left-right direction, and the Z-axis with the up-down direction. Again for easy understanding, there is no acceleration in the y-direction.

The second pitch angle $\theta a$ is defined as the angle between the z-axis of the acceleration sensor and acceleration vector $\alpha$. The second pitch angle $\theta a$ is then given by an angle between a straight line in parallel to the road face and the X-axis of the vehicle body, and coincides with the static pitch angle θs illustrated in FIG. 2A.

Referring now back to FIG. 14. The pitch angle calculator 210 may contain a filter (low-pass filter or band-pass filter) for removing a noise component, wherein the cut-off frequency may only be determined so that the frequency component to be corrected can pass therethrough, for the purpose of correcting high-speed pitch angle variation. The cut-off frequency may, therefore, only be determined between the frequency of the noise and the maximum value of the frequency to be corrected. For an exemplary case where a noise component at around 100 Hz prevails, the cut-off frequency needs to be determined so as to fully attenuate a region at 100 Hz, and may thus be determined to approximately ½ to ⅓ of a noise frequency of 100 Hz, which may be 50 Hz for example.

In Example 1, the second pitch angle θa is correlated to the static pitch angle θs, and the first pitch angle θj is correlated to the dynamic pitch angle θd. More specifically, the static pitch angle θs (standing vehicle posture angle) may be estimated from the second pitch angle θa of the vehicle that stands still. Although the acceleration sensor, structured to acquire the direction and inclination of the gravitational acceleration, cannot discriminate whether the car in a stop mode inclines because it is on a slope, or inclines due to load, the standing vehicle posture angle (static pitch angle θs) may be estimated with use of a known technique (see Patent Literature 3, for example).

Additionally assuming that the standing vehicle posture angle (static pitch angle θs) is kept unchanged during travel, the first pitch angle θj may be set as the dynamic pitch angle θd. For example, by resetting the integral value during a period the angular velocity ωp in the pitch direction is kept zero, and by restarting the integration when the angular velocity ωp becomes non-zero, the integral value is then understood to represent the dynamic pitch angle θd.

The cut-off line control unit 220 conducts the static leveling with reference to the static pitch angle θs, and conducts the dynamic leveling with reference to the dynamic pitch angle θp. For example, the cut-off line control unit 220 controls the level $V_0$ that gives the reference of the cut-off line CL, with use of the static pitch angle θs. The cut-off line control unit 220 also shifts the cut-off line CL up and down relative to the reference level $V_0$, with reference to the dynamic pitch angle θd.

The dynamic leveling may alternatively be applied only for a case where the dynamic pitch angle θp, derived from the first pitch angle θj, is larger than a predetermined threshold value.

There are two possible schemes for the leveling control by the cut-off line control unit 220. One of them relates to a scheme of controlling the optical axis with use of the pitch angle θp. The scheme is referred to as combined control. For the combined control, it suffices to set the level of the cut-off line CL with use of the pitch angle θp as a control angle. In Example 1, the pitch angle θp may be generated by adding θj and θs.

Another leveling control relates to a scheme of controlling the optical axis, while separating the static pitch angle θs and the dynamic pitch angle θd. The scheme is referred to as separated control. The separated control will be described below.

The cut-off line control unit 220 has a correction amount calculator 222 and a correction unit 224. In the separated control, the correction amount calculator 222 calculates the level $V_0$ which gives a reference of the cut-off line CL on the virtual perpendicular screen 2, with use of the static pitch angle θs. The correction amount calculator 222 also calculates the amount of vertical shift (correction amount ΔV) of the cut-off line CL, with reference to the dynamic pitch angle θd. In this embodiment, the positive correction amount ΔV corresponds to the upward shift of the cut-off line CL, meanwhile the negative correction amount ΔV corresponds to the downward shift of the cut-off line CL. The correction unit 224 controls the light emitting element array 112, so as to shift the cut-off line CL from the reference level $V_0$, by the correction amount ΔV.

For example, the light emitting element array 112 has an interface through which image data that specifies ON-OFF (or luminance) of the pixels PIX is input. The correction unit 224 in this case may shift up or down the level of the boundary 116 between the on-pixels and the off-pixels contained in the image data, by the number of pixels Δy, corresponding to the correction amount ΔV. That is, the correction unit 224 shifts up or down the level of the cut-off line (boundary 116) in the light distribution pattern contained in the image data, with reference to the predetermined level $y_0$, so as to cancel the dynamic component θd in the pitch angle θp. The predetermined level $y_0$ represents a reference level that corresponds to $V_0$.

The correction unit 224 may alternatively shift up or down the level (height) of the boundary between the ON-pixels and the OFF-pixels that corresponds to the lower end of the light distribution pattern, by the number of pixels Δy that corresponds to the correction amount ΔV, in addition to the level (height) of the boundary 116 between the ON-pixels and the OFF-pixels that corresponds to the cut-off line CL. That is, the correction unit 224 may shift the entire light distribution pattern up and down, by the number of pixels Δy that corresponds to the correction amount ΔV.

Example 2

The basic structure of the controller of Example 2 is similar to that illustrated in FIG. 14. In Example 2, the static pitch angle θs is determined from the second pitch angle θa, similarly to as in Example 1. That is, the static leveling is the same as in Example 1.

Example 2 is different from Example 1, in terms of the dynamic leveling. More specifically, the dynamic pitch angle θd used in the dynamic leveling is determined not only from the first pitch angle θj, but also from changes in the second pitch angle θa.

Figure 16:
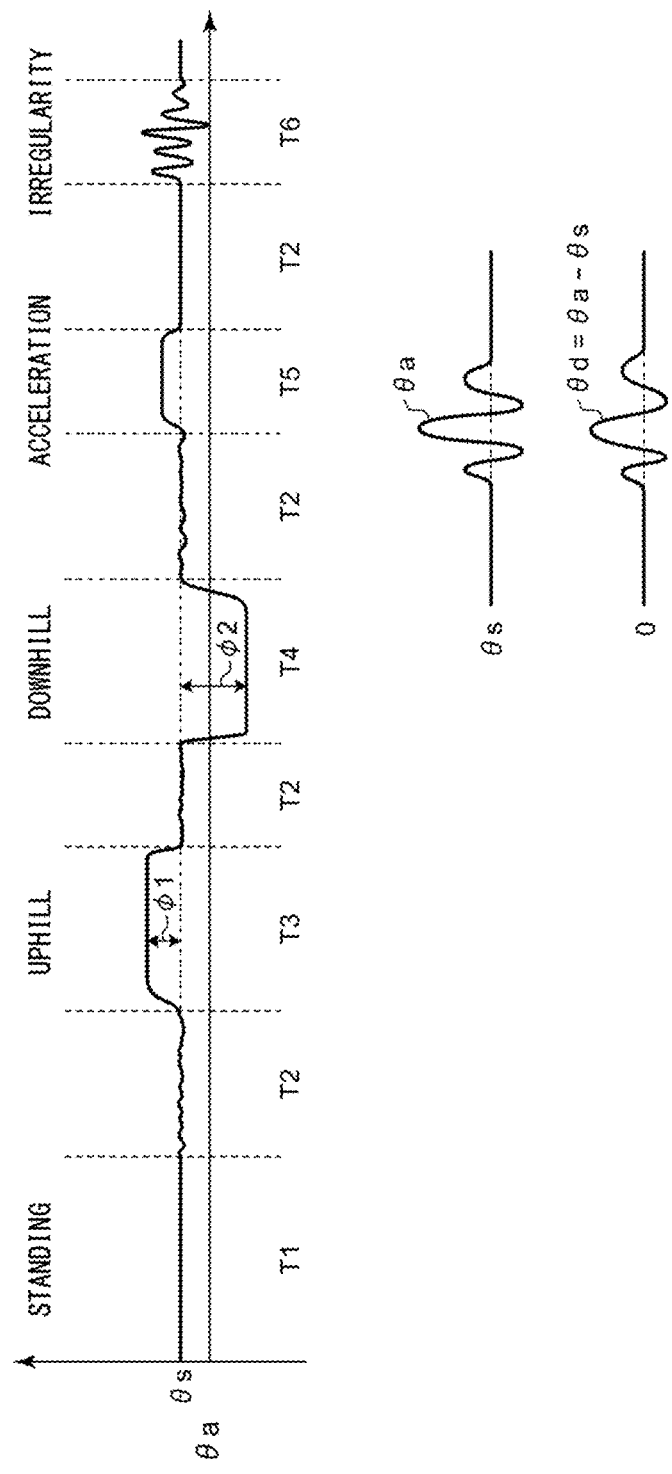
FIG. 16 is a drawing illustrating a second pitch angle θa sensed by a second sensor.

FIG. 16 is a drawing illustrating a second pitch angle θa sensed by the second sensor 122. A section T1 corresponds to a state of the vehicle that stands still on an unsloped road face. The second pitch angle θa of the vehicle that stands still represents the static pitch angle (standing vehicle posture angle) θs.

Section T2 corresponds to travel on a flat road. The second pitch angle θa is kept substantially constant, despite slight changes.

A section T3 corresponds to an uphill with inclination φ1. The second pitch angle θa increases by φ1, from the static pitch angle θs. The change in second pitch angle θa due to the slope, however, does not affect the posture of the vehicle body posture, and is therefore irrelevant to the dynamic pitch angle θd, so that the leveling control will not take place.

A section T4 corresponds to a downhill with inclination φ2. The second pitch angle θa decreases by φ2, from the static pitch angle θs. The change in second pitch angle θa due to the slope, however, does not affect the posture of the vehicle body posture, and is therefore irrelevant to the dynamic pitch angle θd, so that the leveling control will not take place.

A section T5 corresponds to a period of acceleration. The acceleration follows a normal mode, which is distinguished from sudden acceleration described later. In the acceleration period, the posture changes due to nose-up. This makes the second pitch angle θa larger than the static pitch angle θs.

The cut-off line control unit 220 sets the fluctuation range θa-θs of the second pitch angle θa as the dynamic pitch angle θd, and corrects the optical axis with reference to the dynamic pitch angle θd. The scheme is referred to as slow dynamic leveling.

A section T6 corresponds travel over the road face with irregularity. During the travel over irregularity, the second pitch angle θa fluctuates towards both sides of the static pitch angle θs. The cut-off line control unit 220 sets the fluctuation range θa-θs of the second pitch angle θa as the dynamic pitch angle θd, and shifts the optical axis up and down, with reference to the dynamic pitch angle θd. The scheme is referred to as fast dynamic leveling.

Fluctuation of the dynamic pitch angle θd during travel on the irregular road face is also detected as the first pitch angle θj. The leveling control in this case may rely upon either θj or (θa-θd). In an exemplary case where the second pitch angle θa is estimated to contain noise, the leveling control may rely upon the first pitch angle θj.

Alternatively, the leveling control may rely upon averaging of θj and (θa-θd).

Example 3

Figure 17:
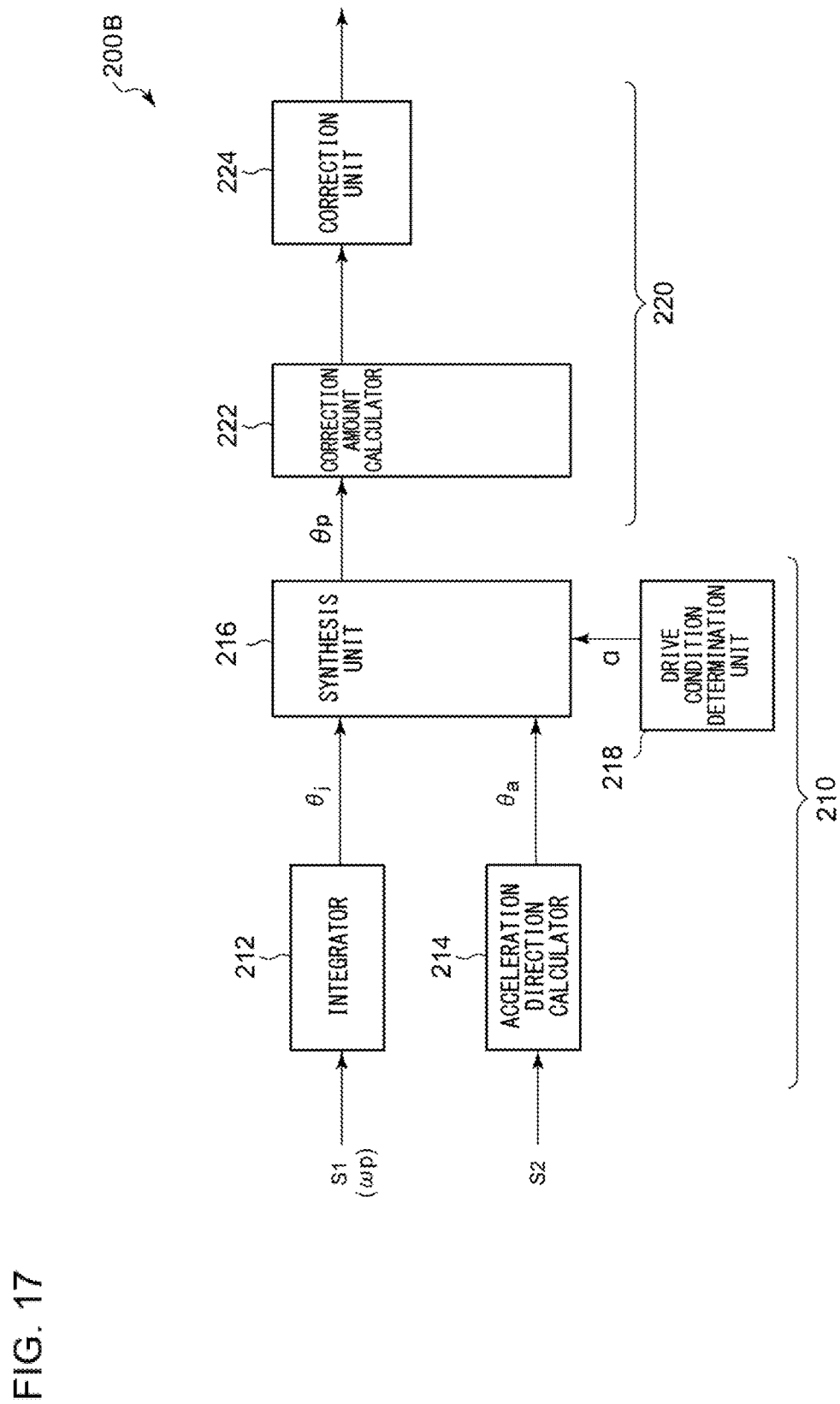
FIG. 17 is a functional block diagram of a controller of Example 3.

FIG. 17 is a functional block diagram of a controller 200B of Example 3. The controller 200A has the pitch angle calculator 210 and the cut-off line control unit 220, similarly as illustrated in FIG. 14.

The pitch angle calculator 210 has a synthesis unit 216 and a travel condition determination unit 218, in addition to the integrator 212 and the acceleration direction calculator 214. The synthesis unit 216 synthesizes the first pitch angle θj and the second pitch angle θa, to generate the pitch angle θp which is angle information necessary for the optical axis correction (leveling control). The pitch angle θp contains the static pitch angle θs and the dynamic pitch angle θd, as described above.

The cut-off line control unit 220, although allowed both for combined control and separation control, will now be assumed to rely upon combined control.

An exemplary processing by the synthesis unit 216 will be described.

The synthesis unit 216 conducts weighted addition of the first pitch angle θj and the second pitch angle θa, to estimate the pitch angle θp with use of Equation (1).

$$\theta p = \alpha \cdot \theta j + \beta \cdot \theta a \quad (1)$$

In an exemplary case where β=1−α holds, then θp is given by Equation (2) below.

$$\theta p = \alpha \cdot \theta j + (1 - \alpha) \cdot \theta a \quad (2)$$

Now, the weighting factors α and β (=1−α) may change dynamically and adaptively, typically depending on a travel environment (travel scene), or state of the vehicle (referred to as travel condition, hereinafter). The travel condition determination unit 218 determines the travel condition, with reference to information from the vehicle (referred to as vehicle information), and/or sensor information. Examples of the vehicle information include vehicle speed, steering angle, camera image, map information, infrastructure information, suspension setting, and vehicle weight. The sensor information includes at least one of the first detection signal S1, the second detection signal S2, or the first pitch angle θj or the second pitch angle θa derived therefrom respectively. The weighting factor α may therefore be set, with reference to at least one of the vehicle information or the sensor information.

That is, during a normal travel in which moderate changes persist in the outputs of the first sensor 120 and the second sensor 122, the leveling control with reference to the output of the second sensor 122 is enabled. On the contrary, under a travel condition where a sharp change in the pitch angle is detectable by the first sensor 120, the leveling control with reference to the first pitch angle θj is enabled, so as to make the control adaptive to the rapid pitch angle variation.

Correlation between several travel conditions and adaptive weighting factors will be described.

(1) Passing Over Large Step or Irregularity

Assume now, for example, that the synthesis unit 216 has judged that the vehicle is passing over a large step, with reference to at least either one of the vehicle information or the sensor information. The leveling control (dynamic leveling) in this case preferably relies upon the first pitch angle θj, while assuming α=1. Since the pitch angle variation upon passing over the step contains high-frequency component, so that the gyro sensor is considered to be more accurate than the G sensor. Setting of α=1 now enables accurate dynamic leveling.

(2) Standing Vehicle

When the vehicle is judged to be standing with reference to at least one of the vehicle information or the sensor information, the synthesis unit 216 sets α=0, and calculates the pitch angle θp with use of the second pitch angle θa. Since the pitch angle θp corresponds to the static pitch angle θs (vehicle posture angle), the static leveling takes place with use of the static pitch angle θs.

(3) Travel on Flat Road

Rapid pitching fluctuation is presumably less likely to occur, during travel on the flat road free of irregularity. The pitch angle θp during travel on the flat road is then calculated, while increasing the weighting of the acceleration sensor, such as setting α to approximately 0.1 to 0.5.

(4) Passing Over Small Step or Irregularity

The frequency of vibration caused by irregularity such as gravel is still higher than 5 Hz, and may even typically be 10 to 20 Hz. In a case of travel on small irregularity, even integration of the outputs of the gyro sensor would fail to calculate a correct pitch angle θj, or the leveling control would not be fully adaptive. Alternatively, even if the pitch angle were correctly calculated by integrating the outputs of the gyro sensor, the leveling control adaptive thereto would be labor-consuming against expectations. The pitch angle θp, for the travel over small irregularity, is therefore calculated by setting α to approximately 0.1 to 0.5, to increase the weighting of the acceleration sensor. This enables the control with use of an average value from which frequency component higher than 5 Hz has been excluded as a noise, thereby making the control less labor-consuming.

(5) Start of Slope (Start Going-Up, Start Going-Down)

At the start of the slope, α may be set to 0.5 to 1.0. Since the pitch angle in this case is predicted to sharply change, so that α is set large to make influence of the gyro sensor dominant, thus enabling rapid dynamic leveling.

(6) End Point of Slope (Goal of Uphill, Goal of Downhill)

At the end of the slope, α may be set to 0.5 to 1.0. Since the pitch angle in this case is predicted to sharply change, so that α is set large to make influence of the gyro sensor dominant, thus enabling rapid dynamic leveling.

(7) Middle of Slope

For a point in the middle of a slope, α is preferably set to 0.1 to 0.5, since the pitch angle θp is considered to be stable.

(8) Sudden Acceleration/Sudden Deceleration

For sudden acceleration/sudden deceleration, α may be set to 0.5 to 1.0. Since rapid fluctuation of the pitch angle θp may occur in this case, the gyro sensor may be largely weighted, thus enabling the dynamic leveling adaptive to dynamic fluctuation of the pitch angle.

Operations of the lamp system 100 of Embodiment 2 are same as those of the lamp system 100 of Embodiment 1. The lamp system 100 of Embodiment 2, having the first sensor 120 and the second sensor 122 combined therein, enables independent detection of static change in posture (static change in pitch angle) of a vehicle body typically depending on the number of passengers, the weight of baggage and the weight of fuel; and sharp change in the pitch angle due to slope of road face on which the vehicle travels, and irregularity or undulation that resides on the road face. This also enables control of the light distribution adaptive to the nature of the detected pitch angle, and can therefore suppress glare due to sudden vibration of the vehicle body during travel.

Modified Example 2

A modified example derived from Embodiment 2 will be described.

Modified Example 2.1

The second sensor 122 may employ a vehicle height sensor, in place of the acceleration sensor. The vehicle height sensor may be constituted solely by a rear vehicle height sensor, or by a hybrid system of the rear vehicle height sensor and a front vehicle height sensor.

Modified Example 2.2

The embodiment has constituted the high-definition lamp unit 110 with the light emitting element array 112. The present disclosure is, however, not limited thereto. For example, the high-definition lamp unit 110 may contain a light source that generates light with a substantially flat intensity distribution, and a spatial light modulator that spatially patterns the emitted light of the light source. The spatial light modulator is exemplified by digital micromirror device (DMD), and liquid crystal device.

Modified Example 2.3

The technique by which the controller 200 shifts the level of the cut-off line CL up and down is not limited to that described in the embodiments. For example, the light emitting element array 112 may have a pixel shifting function. In this case, the light emitting element array 112 may only be given the image data as the reference, and the pixel shift amount Δy.

Modified Example 2.4

Control of the optical axis, that is, control of the height of the cut-off line is not limited to pixel control of the high-definition lamp unit 110 (electronic leveling). For example, an ordinary low beam unit may be structured to be controllable with a high-speed leveling actuator, thus making it possible to control the height of the cut-off line by changing the inclination of the low beam unit (referred to as mechanical leveling). Alternatively, the position of the light emitting element array 112 may be structured to allow mechanical shifting.

Alternatively, the electronic leveling and the mechanical leveling may be combined. In this case, the electronic leveling may be applied to sharp changes in the pitch angle, and the mechanical leveling may be applied for gradual changes in the static pitch angle.

Modified Example 2.5

Having described in the embodiments that the optical axis was actively controlled to direct upwards upon forward sink (nose-dive) of the vehicle body during travel, to which application of the present disclosure is not limited. The upward control may alternatively be limited to the static leveling, meanwhile the dynamic leveling may take part only in controlling the optical axis directed downwards, without controlling the optical axis directed upwards.

The upward control of the optical axis may alternatively be limited to the static leveling and to the slow dynamic leveling, meanwhile the rapid dynamic leveling may take part only in controlling the optical axis directed downwards, without controlling the optical axis directed upwards.

Layout

Figure 18:
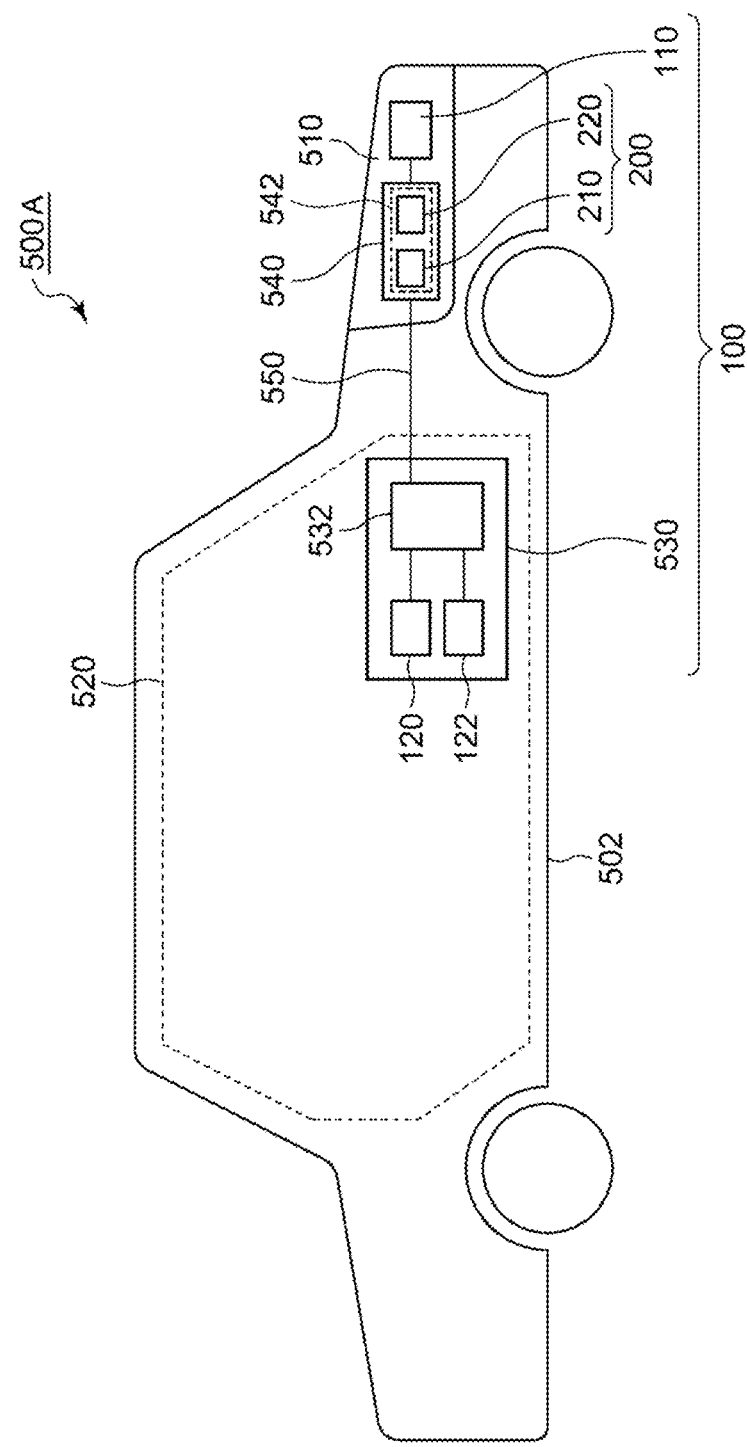
FIG. 18 is a drawing illustrating an exemplary design of a vehicle equipped with a lamp system.

FIG. 18 is a drawing illustrating an exemplary design of a vehicle 500A equipped with a lamp system 100. As has been described in Embodiment 2, the lamp system 100 has the high-definition lamp unit 110, the controller 200, the first sensor 120, and the second sensor 122.

The high-definition lamp unit 110 is built in the headlamp 510A. On the other hand, the first sensor 120 which is a gyro sensor, and the second sensor 122 that contains an acceleration sensor or a vehicle height sensor, are provided in a cabin 504.

The controller 200 has the pitch angle calculator 210 and the cut-off line control unit 220, as has been illustrated in FIG. 3. The pitch angle calculator 210 and the cut-off line control unit 220 are mounted as the same hardware (processor), on a headlamp 510A side. More specifically, the pitch angle calculator 210 and the cut-off line control unit 220 are mounted on a second processor 542 that is provided on the headlamp 510A side, that is, outside a cabin 504 (inside an engine room). The second processor 542 can be a part of a unit called control module 540. The control module 540 may contain, for example, a power supply circuit that supplies power to the high-definition lamp unit 110, in addition to the second processor 542. Each of the first processor 532 and the second processor 542 may be a microcontroller that contains a software-controllable CPU.

The first sensor 120 and the first processor 532 are integrated into a unit called leveling ECU 530. The second sensor 122, when given as an acceleration sensor, may also be built in the leveling ECU 530. Each of the first sensor 120 and the second sensor 122 may be a six-axis sensor 124 in which a gyro sensor and an acceleration sensor are integrated.

The first processor 532 inside the cabin 504, and the second processor 542 outside the cabin 504 are connected with a vehicle bus 550 such as CAN, or through other interface.

In the design illustrated in FIG. 18, the first processor 532 supplies the angular velocity signal derived from the first detection signal S1 that is generated by first sensor 120, directly to the second processor 542. That is, the second processor 542 functions as an interface of the vehicle bus 550.

The second processor 542 integrates the angular velocity signal, converts the result into the pitch angle information (first pitch angle θj), and controls the high-definition lamp unit 110 with use of the first pitch angle θj.

An exemplary design of the lamp system 100 has been described. Next, advantages of the design will be explained.

The headlamp 510A is relatively easily attachable to and detachable from the vehicle body 502 as compared with other car components, so that the positional relation between the headlamp 510A and the vehicle body 502 is expected to contain a certain degree of error. Now the structure, having the first sensor 120 as the gyro sensor built in or externally attached to the headlamp 510A, would degrade detection accuracy of change in the pitch angle θ, due to limited accuracy of assembly of the headlamp 510A to the vehicle body 502. For improved detection accuracy, some calibration will be necessary.

Inside of the engine room, in which the headlamp 510A is arranged, is environmentally severe, and is susceptible to influence of temperature change or humidity change. Placement of the gyro sensor on the headlamp side, that is, inside the engine room would degrade accuracy of detection of the pitch angle variation, since the output of the gyro sensor would be affected by the environment.

In the structure illustrated in FIG. 18, the error in the positional relation between the vehicle body 502 and the gyro sensor may be reduced, by isolating the gyro sensor, or the first sensor 120, from the headlamp 510A and instead by arranging it in the cabin 504, whereby also temperature fluctuation of the gyro sensor may be suppressed. This successfully enhances the detection accuracy of the pitch angle variation.

Figure 19:
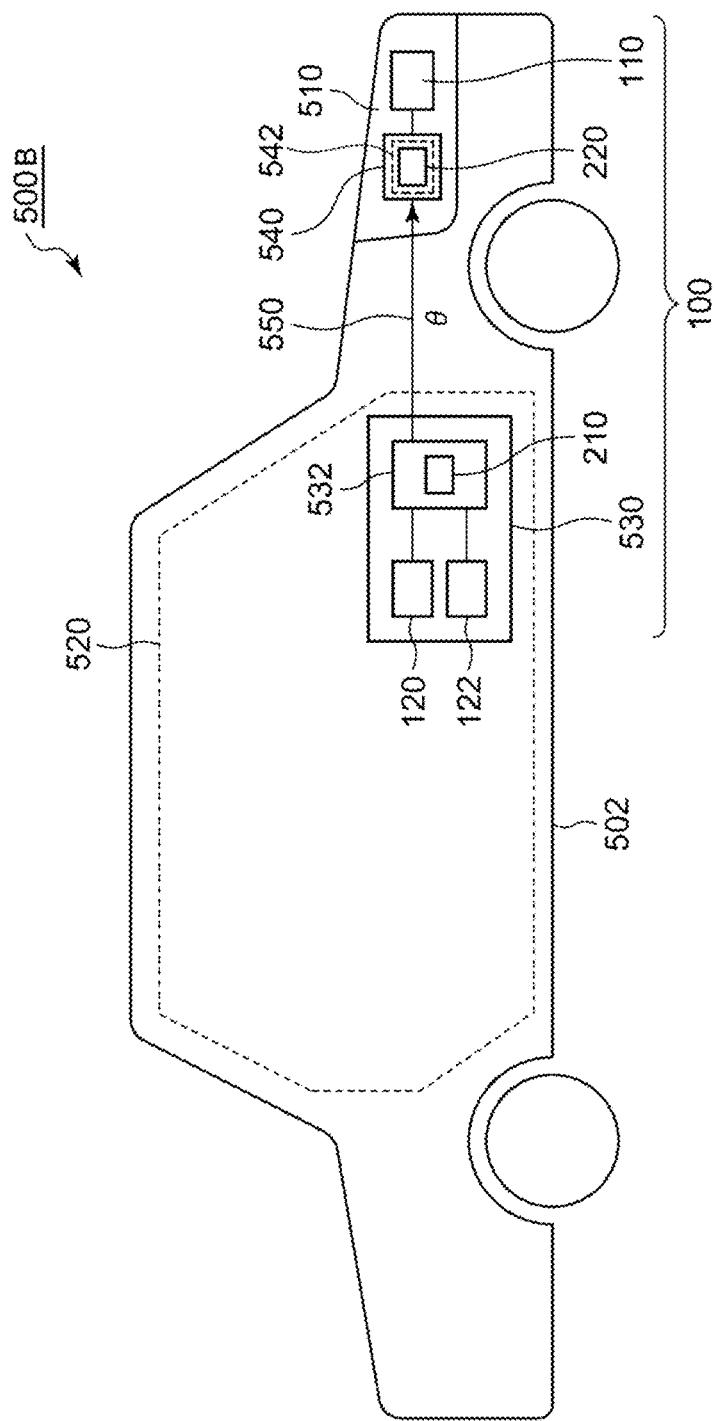
FIG. 19 is a drawing illustrating another exemplary design of a vehicle equipped with a lamp system.

FIG. 19 is a drawing illustrating another exemplary design of a vehicle 500B equipped with the lamp system 100.

In this example, the pitch angle calculator 210 and the cut-off line control unit 220 are mounted as separate processors. More specifically, the pitch angle calculator 210 is mounted on the first processor 532 in the cabin 504, meanwhile the cut-off line control unit 220 is mounted on the second processor 542 on the headlamp 510B side.

The cut-off line control unit 220 of the first processor 532 integrates the angular velocity signal that is the output of the first sensor 120, to calculate the first pitch angle θj. The cut-off line control unit 220 also calculates the second pitch angle θa from the output of the second sensor 122. The first processor 532 transmits the pitch angle information θ, derived from the first pitch angle θj and the second pitch angle θa, to the second processor 542. The pitch angle information θ may contain both the first pitch angle θj and the second pitch angle θa, or may be information obtained by synthesizing the first pitch angle θj and the second pitch angle θa.

The second processor 542 that corresponds to the cut-off line control unit 220 controls the high-definition lamp unit 110, with use of the pitch angle information θ.

In the structure illustrated in FIG. 19, the error in the positional relation between the vehicle body 502 and the gyro sensor may be reduced, by isolating the gyro sensor, or the first sensor 120, from the headlamp 510B and instead by arranging it in the cabin 504, whereby also temperature fluctuation of the gyro sensor may be suppressed, similarly to as in the design illustrated in FIG. 18. This successfully enhances the detection accuracy of the pitch angle variation.

The design illustrated in FIG. 19 has the following advantages over the design illustrated in FIG. 18. A possible problem in the design illustrated in FIG. 18 will be described.

Figure 20:
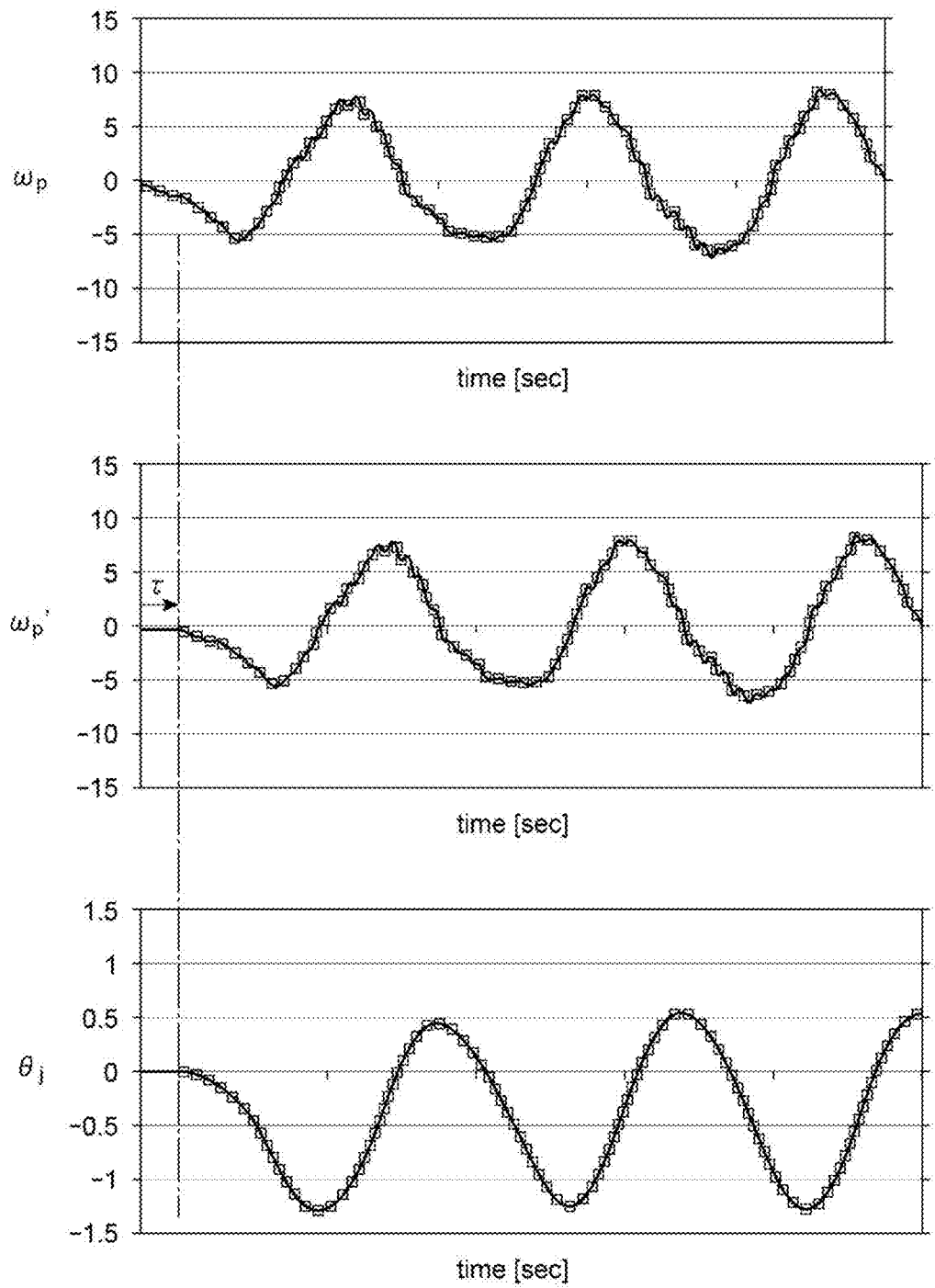
FIG. 20 is a drawing illustrating signal transmission and processing in the design illustrated in FIG. 18.

FIG. 20 is a drawing illustrating signal transmission and processing in the design illustrated in FIG. 18. The angular velocity signal ωp, which is an output of the gyro sensor, is generated at a predetermined sampling rate (typically 1 kHz, or 1 ms cycle). Data volume of the angular velocity signal ωp is therefore large, which results in transmission delay td when the signal is transmitted from the first processor 532 to the second processor 542 through the vehicle bus 550.

The second processor 542 receives the delayed angular velocity signal ωp', through the vehicle bus 550. The second processor 542 then integrates the angular velocity signal ωp' to convert it into the first pitch angle θj. While ignoring the delay of processing, the first pitch angle θj will be delayed by time t behind the original angular velocity signal ωp. That is, the transmission delay td through the vehicle bus 550 limits the response speed of the lamp system 100. Speed-up of response is, however, difficult to be achieved by a prior CAN, and needs employment of the vehicle bus 550 with small transmission delay td, which eventually pushes up the cost.

A possible measure for reducing the transmission delay td is to reduce the data volume to be transmitted, typically by thinning out sampling of the angular velocity signal ωp. This measure, however, increases error in the pitch angle θj obtainable by integrating the angular velocity signal ωp. That is, the leveling control will degrade the accuracy.

Figure 21:
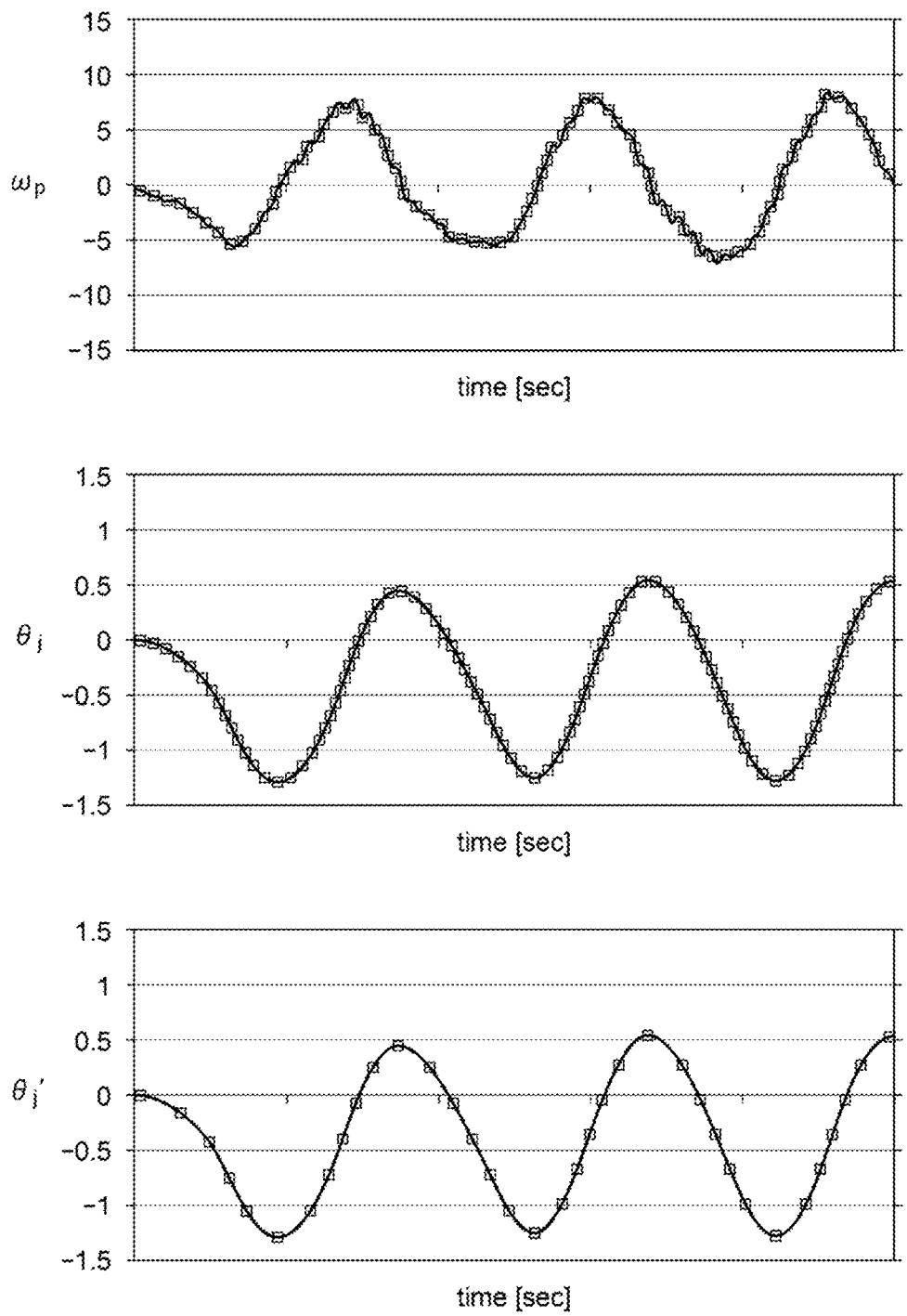
FIG. 21 is a drawing illustrating signal transmission and processing in the design illustrated in FIG. 19.

FIG. 21 is a drawing illustrating signal transmission and processing in the design illustrated in FIG. 19. In the design illustrated in FIG. 19, the first processor 532 in the cabin converts, by integration, the angular velocity signals ωp into the first pitch angle θj. Since this stage is not yet affected by the transmission delay τd, so that the first pitch angle θj may be calculated substantially in real time, or only with a very small delay, if the calculation delay is ignored. The first processor 532 transmits the first pitch angle information θj', derived from the first pitch angle θj, through the vehicle bus 550 to the second processor 542.

The speed (update rate), at which the second processor 542 updates the light distribution of the high-definition lamp unit 110, may be approximately several tens Hz to 100 Hz (60 fps, 16.6 ms cycle, for example). That is, the first pitch angle θj may only be supplied to the second processor 542, at a rate of approximately several tens Hz to 100 Hz (60 fps, 16.6 ms cycle, for example). In other words, the first processor 532 is no longer necessary to transmit all samples of the calculated first pitch angle θj to the second processor 542, and may only transmit the downsampled first pitch angle θj' to the second processor 542. This case can reduce the number of samples, or the data volume, to be transmitted through the vehicle bus 550, down from the design illustrated in FIG. 18. This successfully shortens the transmission delay τd through the vehicle bus 550. In other words, the design illustrated in FIG. 19 may employ a vehicle bus 550 with a slower transmission rate, as compared with the design illustrated in FIG. 18.

Prediction of Pitch Angle Variation

In the design illustrated in FIG. 19, influence of the transmission delay τd becomes larger, as the frequency of the pitch angle variation becomes higher, or, the vibration cycle becomes shorter. Hence, although influence of the transmission delay τd would be ignorable at around 1 Hz, the response delay would pose a problem for high-frequency (2 to 5 Hz, for example) vibration. The paragraphs below will explain a technique for further improving the response speed of the lamp system 100. The prediction of the pitch angle variation may also be applicable to the design illustrated in FIG. 18.

The first processor 532 generates a future predicted value $\hat{\theta j}$ of the first pitch angle θj, from the output of the first sensor 120. Given the transmission delay τd through the vehicle bus 550, the predicted value $\hat{\theta j}$ preferably has a value at or after a time $(t_i+\tau d)$ that is τd ahead of current time $t_i$. A technique of predicting the first pitch angle θj is not particularly limited.

The second processor 542 conducts the leveling control, with reference to the predicted value $\hat{\theta j}$ of the first pitch angle.

Figure 22:
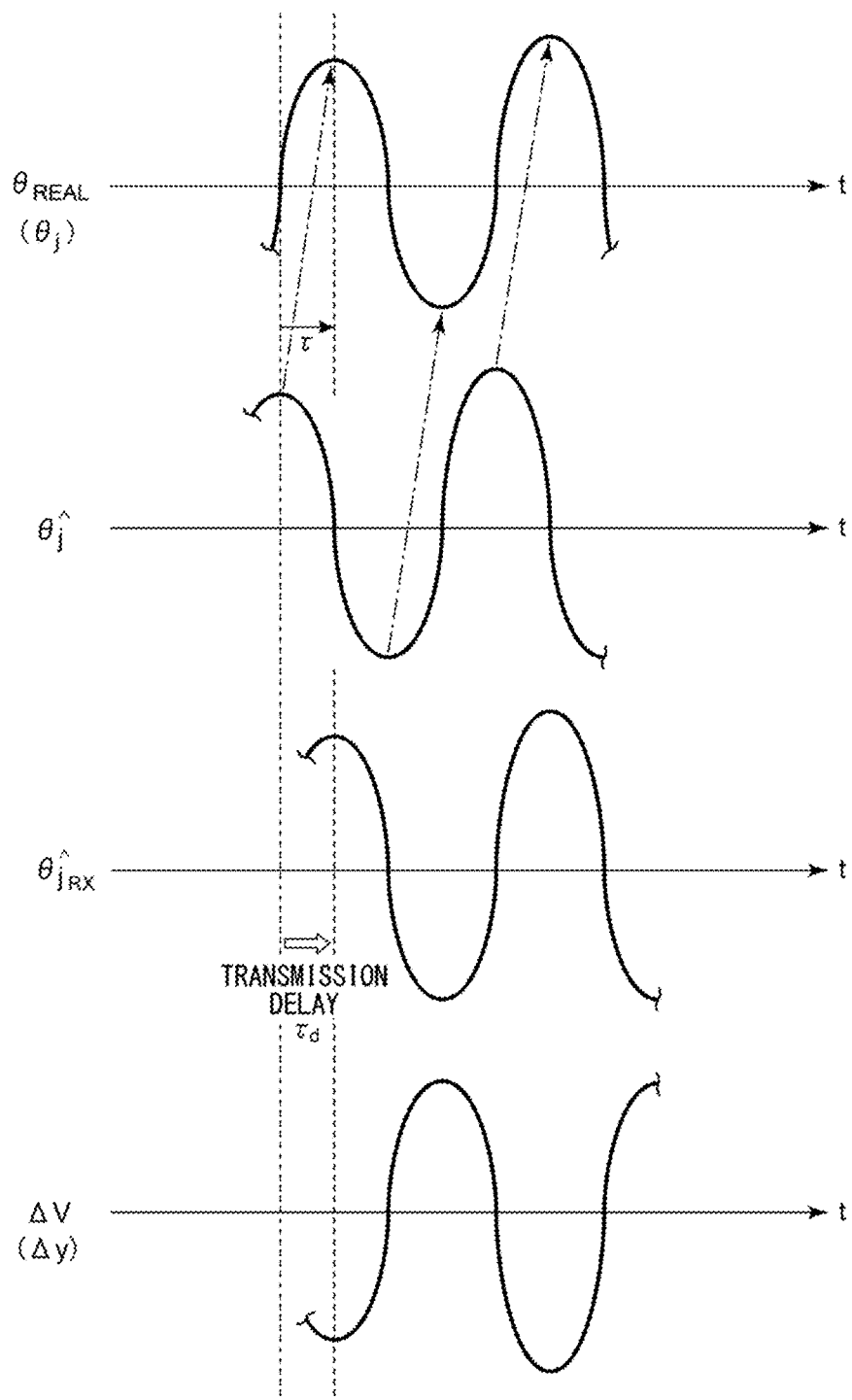
FIG. 22 is a drawing illustrating cut-off line control with reference to a predicted value of pitch angle.

FIG. 22 is a drawing illustrating the cut-off line control with reference to the predicted value of pitch angle. $\theta_{REAL}$ represents an actual pitch angle. The first processor 532 integrates the outputs of the gyro sensor, to generate the first pitch angle θj that represents the pitch angle $\theta_{REAL}$.

$\hat{\theta j}$ represents a predicted value of the first pitch angle θj, generated by the first processor 532. At any time $t_i$, the predicted value θj represents the first pitch angle θj at future time $(t_i+\tau)$. The first processor 532 transmits the predicted value $\hat{\theta j}$ to the second processor 542. For easy understanding and simple explanation, τ is now considered to be substantially equal to the transmission delay τd from the first processor 532 to the second processor 542.

$\hat{\theta j}_{RX}$ represents the predicted value $\hat{\theta j}$ received by the second processor 542. The second processor 542 conducts the leveling control, with reference to the received pitch angle $\hat{\theta j}_{RX}$. ΔV represents a control amount of the leveling control.

$\hat{\theta j}_{RX}$ comes behind $\hat{\theta j}$, with propagation delay τd. The $\hat{\theta j}_{RX}$ will coincide with the real pitch angle $\theta_{REAL}$ on the temporal axis. The waveform of ΔV therefore coincides with the real pitch angle $\theta_{REAL}$ on the temporal axis, thus making it possible to reduce the influence of the transmission delay τd in the leveling control.

Figure 23:
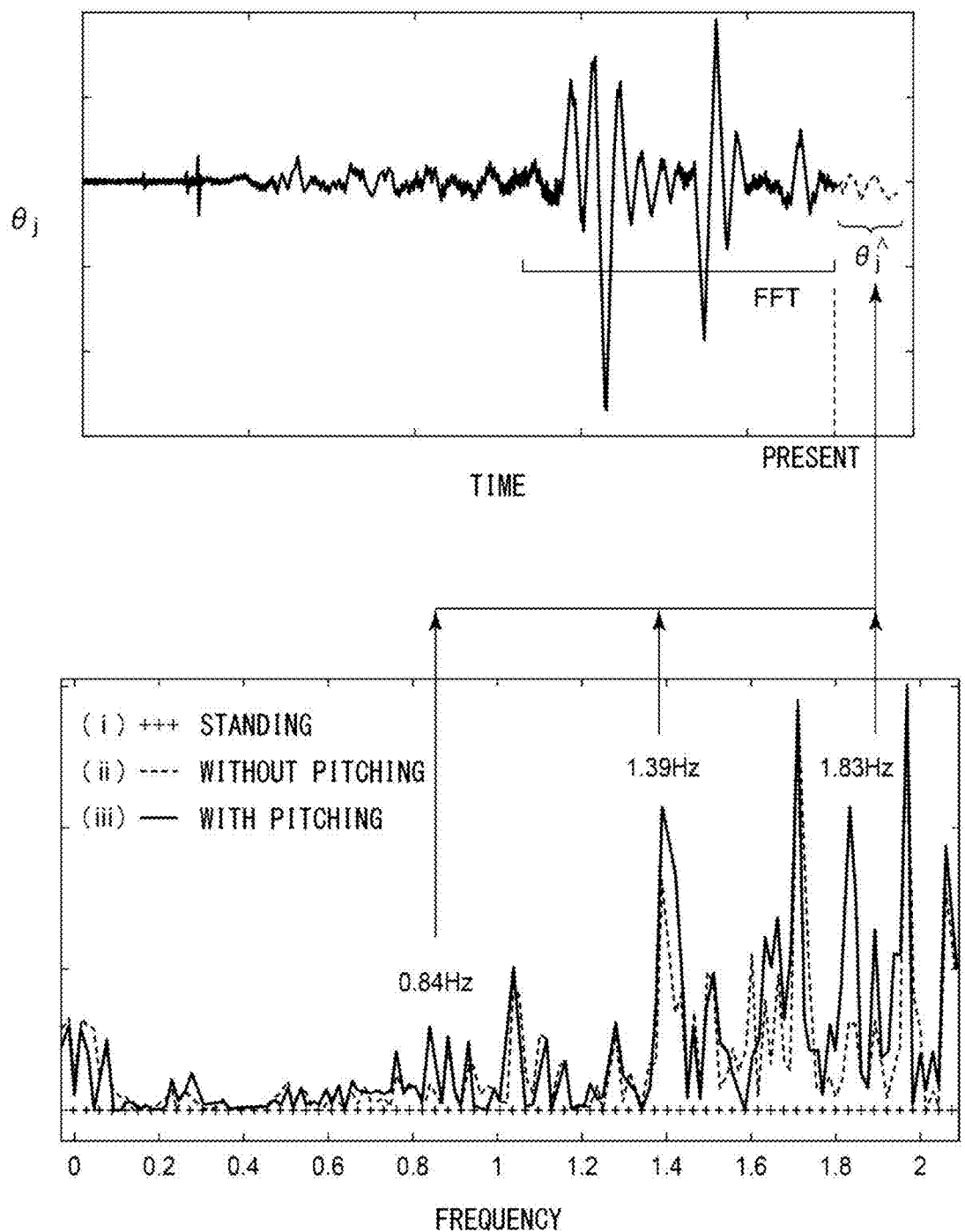
FIG. 23 is a drawing illustrating prediction of a first pitch angle θj analyzed by FFT.

For example, the first processor 532 may predict the first pitch angle θj by fast Fourier transform (FFT). FIG. 23 is a drawing illustrating prediction of the first pitch angle θj analyzed by FFT. The upper tier of FIG. 23 illustrates an exemplary temporal waveform of the first pitch angle θj.

The first processor 532 converts the temporal waveform of the first pitch angle θj up to the present, into spectral information in a frequency region. The lower tier of FIG. 23 illustrates spectra of the first pitch angle θj obtainable in three states. More specifically, the three spectra illustrated herein includes the states of (i) vehicle in standing, (ii) without pitching generated during travel, and (iii) with pitching generating during travel. (ii) The state without pitching corresponds to travel on the flat road free of step or irregularity of road face, which is a situation without need of the optical axis correction. (iii) The state with pitching corresponds to travel on the road face with step or irregularity, which is a situation in need of the optical axis correction. As indicated by (ii), the spectrum contains several frequency components, even during travel on the flat road face. Upon occurrence of pitching, as indicated by (iii), specific frequency components grow up from the spectrum indicated by (ii). In the example illustrated in FIG. 23, the pitching presumably needs the optical axis correction at 0.84 Hz, 1.39 Hz, and 1.83 Hz. The first processor 532 can generate a future predicted value $\hat{\theta j}$ in the time domain of the first pitch angle θj, from the specific frequency components.

The future predicted value $\hat{\theta j}$ of the first pitch angle θj may alternatively be generated with use of a deep learning-based algorithm for time series prediction of waveform data.

The first processor 532 may transmit θj, together with the predicted value $\hat{\theta j}$, to the second processor 542. The second processor 542 in this case conducts the leveling control, with use of the current first pitch angle θj having been actually measured, and the predicted value $\hat{\theta j}$ of the first pitch angle for the future. The second processor 542 may synthesize (typically by weighted addition) the two pitch angles θj and $\hat{\theta j}$ to generate the pitch angle θj*, and may conduct the leveling control with use of the pitch angle θj*.

Alternatively, the second processor 542 may normally conduct the leveling control with use of the first pitch angle θj having been actually measured, meanwhile may incorporate the predicted value $\hat{\theta j}$ in the leveling control, if the predicted value $\hat{\theta j}$ becomes large.

Under low frequency, the leveling control properly takes place without the predictive control, since the control is less susceptible to the transmission delay τd. The second processor 542 may therefore conduct the leveling control with use of the first pitch angle θj under low vibration frequency, meanwhile may conduct the leveling control with use of the predicted value $\hat{\theta j}$ of the first pitch angle under high vibration frequency.

The predicted value $\hat{\theta j}$ is not always accurate, so that the leveling control if conducted with use of an erroneous negative predicted value $\hat{\theta j}$ would shift the optical axis upwards to unfortunately give glare. The second processor 542 may therefore reflect the predicted value $\hat{\theta j}$, when given as positive (nose-up), to the leveling control; meanwhile does not reflect or may reduce, relative to the positive case, the proportion of contribution of the predicted value $\hat{\theta j}$, when given as negative (nose-dive), to the leveling control.

When generating the predicted value $\hat{\theta j}$, the first processor 532 may generate an index that represents accuracy of the predicted value. The second processor 542 in this case may conduct the leveling control with reference to the predicted value $\hat{\theta j}$ if the accuracy is high; meanwhile may ignore the predicted value $\hat{\theta j}$ if the accuracy is low.

Such use of the predicted value $\hat{\theta j}$ of the first pitch angle makes it possible to recover or reduce influence of the transmission delay or signal processing delay, thereby making the control adaptive to still faster pitch angle variation.

Modified Example 3

Modified examples of the cut-off line control with reference to the predicted value $\hat{\theta j}$ of the first pitch angle θj will be described. Note that the modified examples described here are applicable to both designs illustrated in FIGS. 18 and 19. The modified examples described here are also applicable to the control without use of the predicted value $\hat{\theta j}$.

Modified Example 3.1

Figure 24:
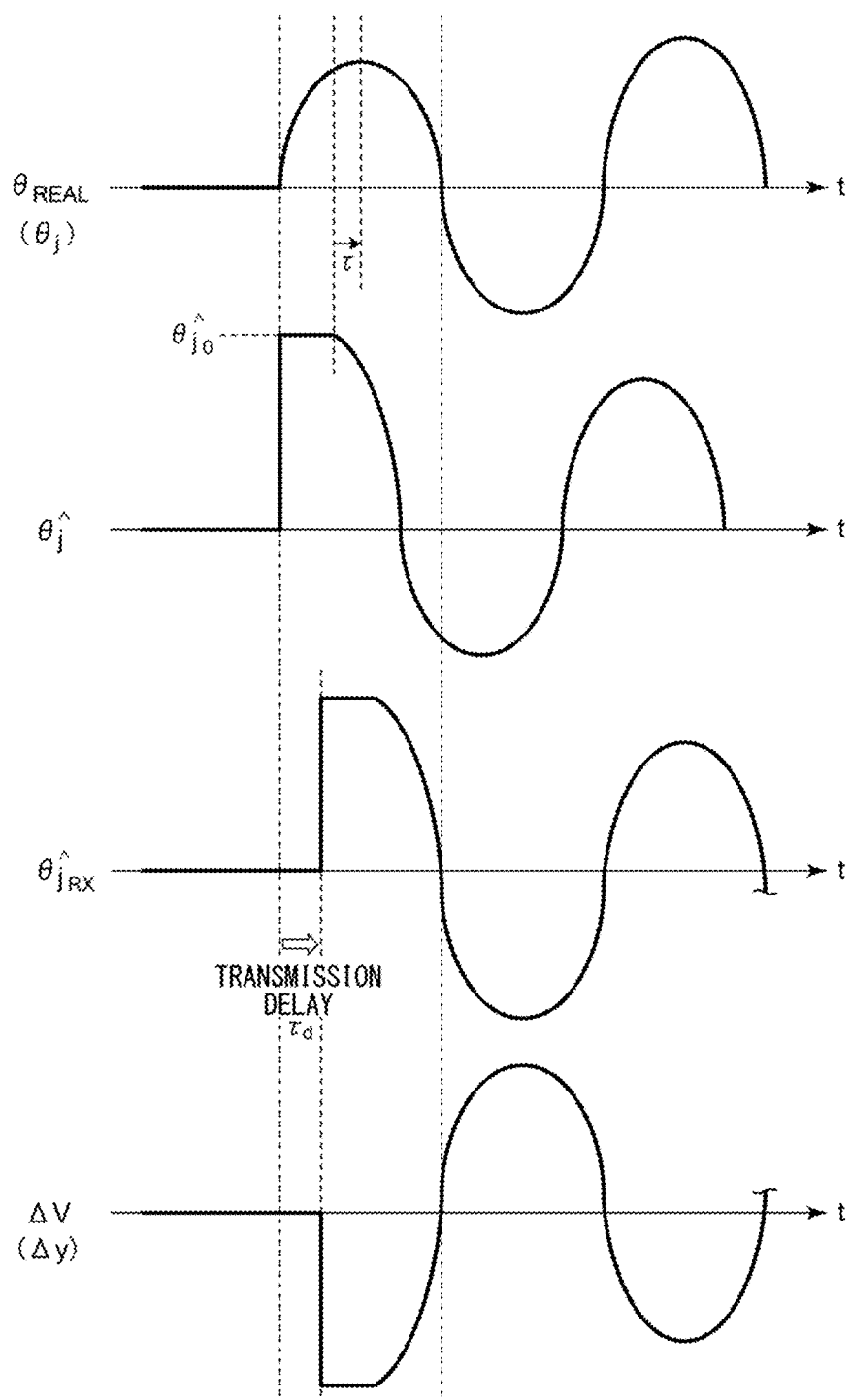
FIG. 24 is a drawing illustrating a cut-off line control according to Modified Example 3.1.

FIG. 24 is a drawing illustrating leveling control according to Modified Example 3.1. The first pitch angle θj cannot be accurately predicted immediately after the start of vibration, since there is not enough information. A provisional predicted value $\theta j_0\hat{}$ may therefore be used, immediately after the start of vibration. The provisional predicted value $\theta j_0\hat{}$ may be set to 2° or −2°, since, in most cases, pitching of the vehicle assumed in normal travel scene falls within a range of ±2°. The pitch angle calculator 210 may output the provisional predicted value $\theta j_0\hat{}$ to the control module 540, immediately after the start of vibration, that is, in a period with low accuracy of the predicted value; meanwhile may supply the predicted value $\theta j\hat{}$ generated by calculation to the control module 540, after data necessary for prediction is accumulated to increase the accuracy of the predicted value.

With use of the provisional predicted value $\theta j_0\hat{}$, Modified Example 3.1 thus enables the leveling correction even in a period in which the prediction is difficult. Modified Example 3.2

Figure 25:
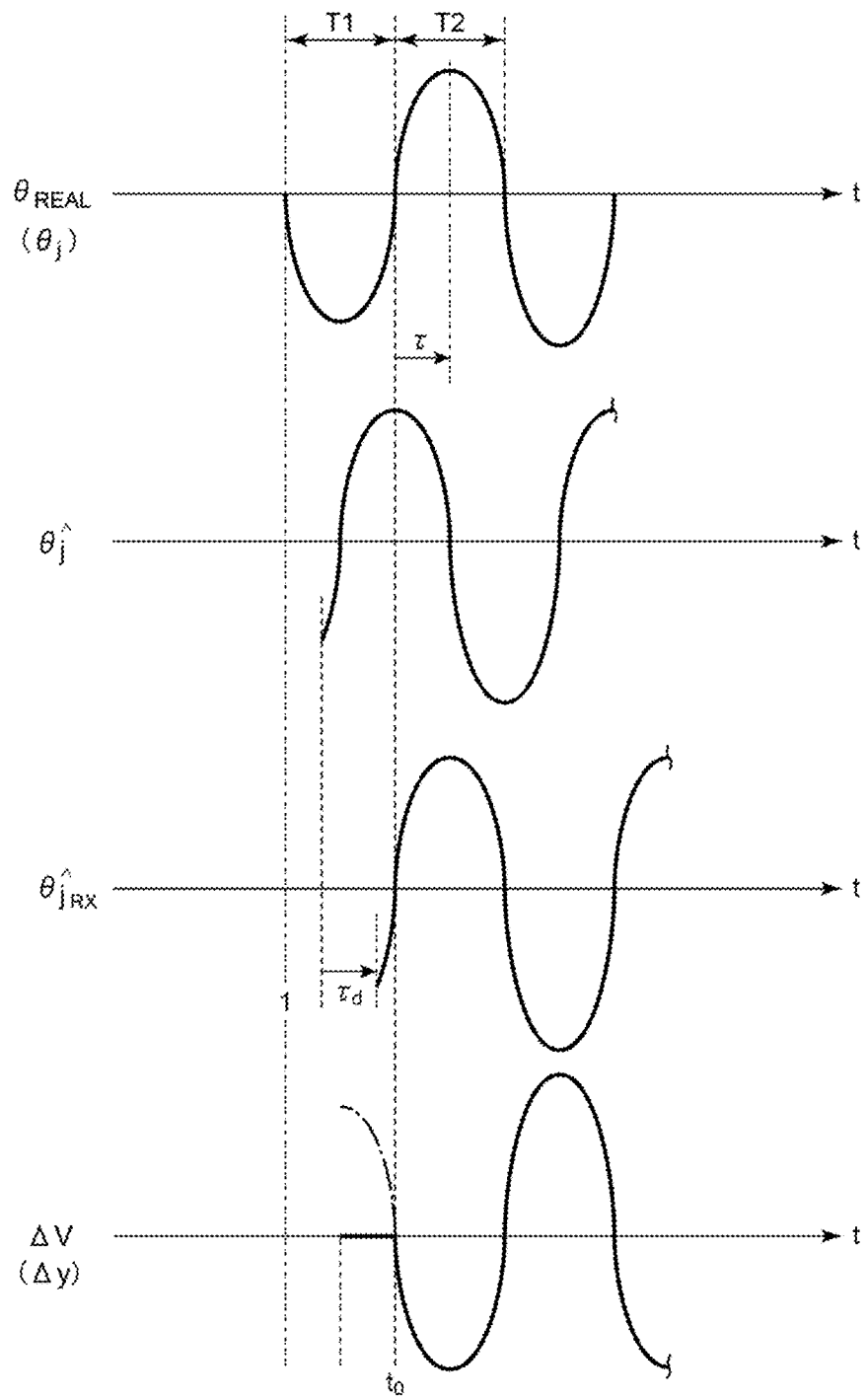
FIG. 25 is a drawing illustrating a cut-off line control according to Modified Example 3.2.

FIG. 25 is a drawing illustrating cut-off line control according to Modified Example 3.2. FIG. 25 illustrates a state where vibration preceded by nose-dive occurred. In a half period T1 after the start of vibration, the pitch angle $\theta_{REAL}$ becomes negative due to nose-dive, meanwhile in the next half period T2, the pitch angle $\theta_{REAL}$ becomes positive due to nose-up.

Under such vibration, the cut-off line control unit 220 does not change the height of the cut-off line, during the period T1 of the first nose-dive, that is, the period during which $\theta j\hat{}_{RX}$ stays negative. That is, $\Delta V=0$ holds.

The cut-off line control unit 220 controls the height of the cut-off line with reference to $\theta j\hat{}_{RX}$, at and after time to when the period T2 starts.

Upon nose-dive, upward shift of the cut-off line with use of an erroneous predicted value would give glare to an oncoming vehicle. Now, Modified Example 3.2 can suppress glare also under vibration which begins with nose-dive, by not shifting the cut-off line upwards during the first nose-dive period.

Modified Example 3.3

Figure 26:
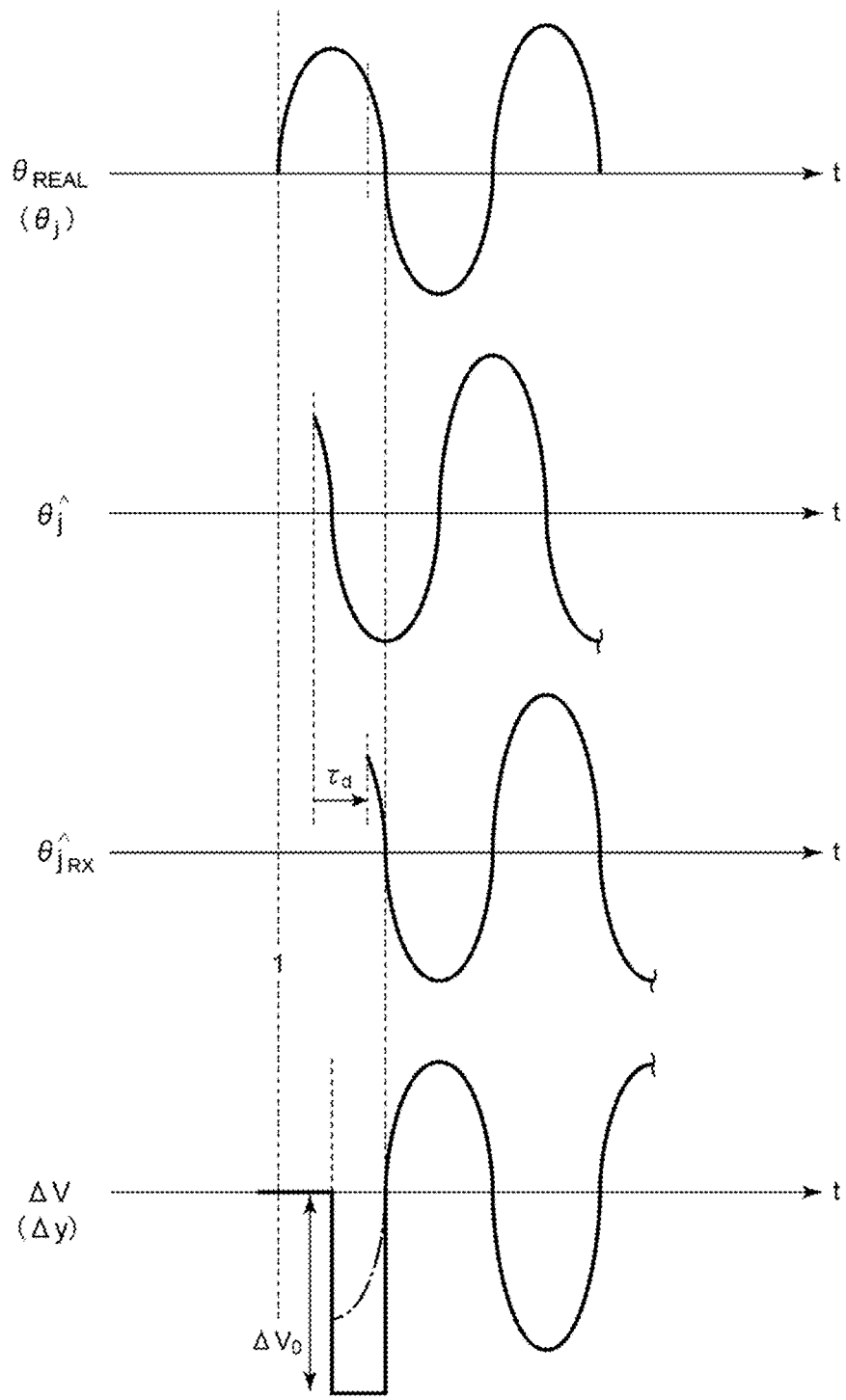
FIG. 26 is a drawing illustrating a cut-off line control according to Modified Example 3.3.

FIG. 26 is a drawing illustrating the cut-off line control according to Modified Example 3.3. FIG. 26 represents a state where the vibration preceded by nose-up occurred. In a half period T1 after the start of vibration, the pitch angle $\theta_{REAL}$ becomes positive due to nose-up, meanwhile in the next half period T2, the pitch angle $\theta_{REAL}$ becomes negative due to nose-dive.

Under such vibration, the cut-off line control unit 220 lowers the height of the cut-off line by a predetermined width $\Delta V_0$, during the period T1 of the first nose-dive, that is, the period during which $\theta j\hat{}_{RX}$ stays positive.

The predetermined width $\Delta V_0$ can be set to an amount that corresponds, for example, to 2°, since, in most cases, pitching of the vehicle assumed in normal travel scene falls within a range of ±2°, as described previously.

The control illustrated in FIG. 26 can therefore prevent glare under any types of vibration, by correcting the height of the cut-off line, while assuming a case where the maximum pitch angle variation occurs.

Modified Example 3.4

In place of lowering, as in Modified Example 3.3, the height of the cut-off line by $\Delta V_0$, the brightness near the cut-off line may alternatively be reduced. This can reduce the amount of light possibly illuminated on an oncoming vehicle, and can suppress glare, even if nose-up occurred and the optical axis were shifted upwards.

A modified example of the layout will be described. Although the gyro sensor, or the first sensor 120, in the structure having been illustrated in FIG. 18 was arranged in the cabin 504, while separated from the headlamp 510A, the position of the gyro sensor is not limited in the cabin 504. For example, the gyro sensor, or the first sensor 120, may be arranged at a position isolated from the headlamp 510A in the engine room. This successfully reduces the error in the positional relation between the vehicle body 502 and the gyro sensor.

Structure of Headlamp

Figure 27:
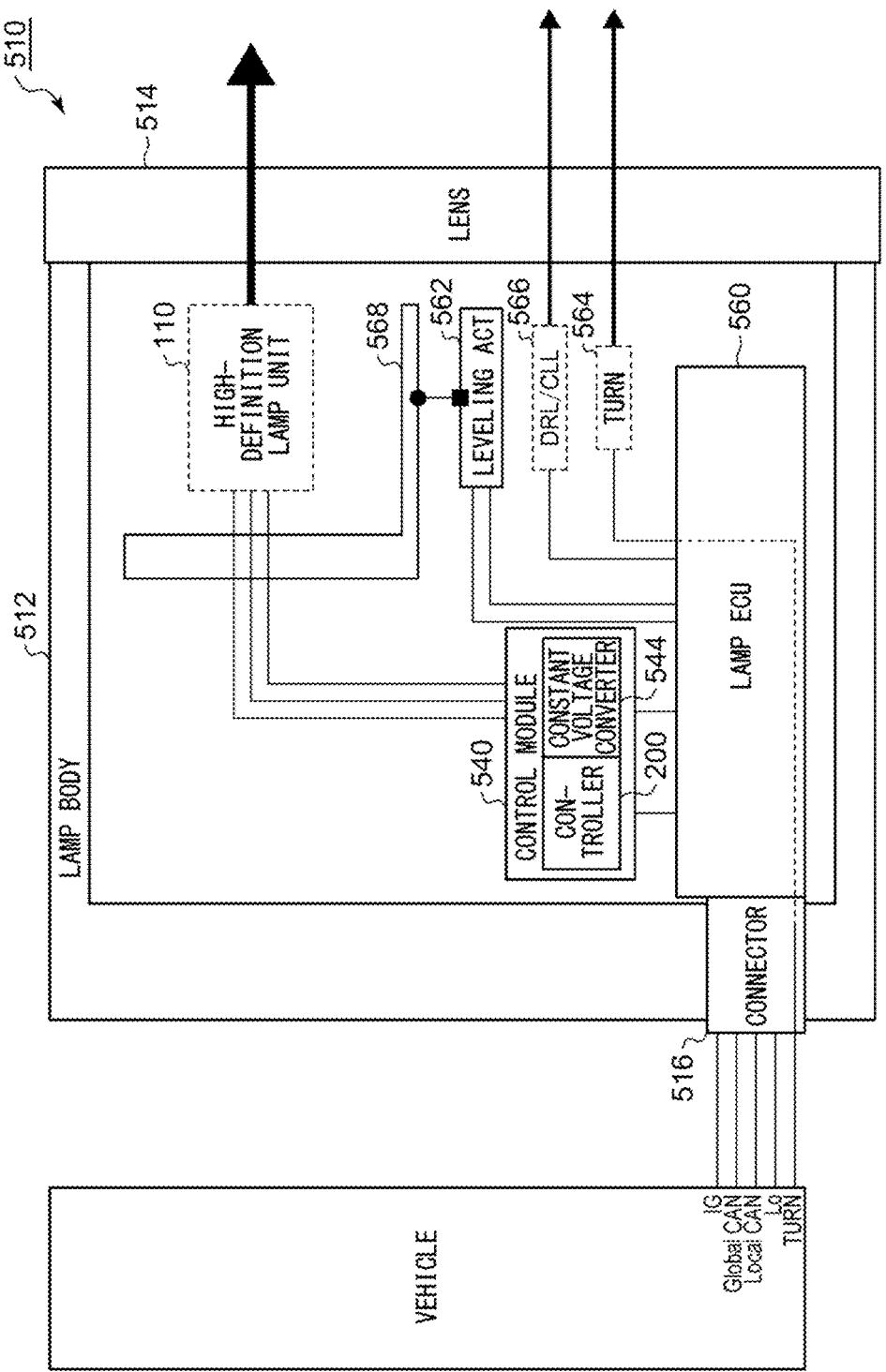
FIG. 27 is a drawing illustrating an exemplary structure of a headlamp.

FIG. 27 is a drawing illustrating an exemplary structure of a headlamp 510. The headlamp 510 contains a lamp body 512, a lens 514, a connector 516, the high-definition lamp unit 110, the control module 540, a lamp ECU 560, a leveling actuator 562, a turn lamp 564, a clearance lamp 566, and a lamp bracket 568.

The headlamp 510 is connected to the vehicle, with a cable connected to the connector 516. The cable contains transmission lines for power signal IG, global CAN signal, local CAN signal, low beam turn-on instruction signal Lo, and turn signal TURN (these signals are collectively referred to as control signal).

The lamp ECU 560 controls on/off and light distribution of the high-definition lamp unit 110, in response to the control signal from the vehicle body. The lamp ECU 560 also controls on/off of the turn lamp 564 and the clearance lamp 566.

The control module 540 is structured to control the high-definition lamp unit 110, and contains the controller 200 and a constant voltage converter 544. The controller 200 receives information regarding the pitch angle, through the CAN interface of the lamp ECU 560. Note that a portion of the controller 200, which corresponds to the pitch angle calculator 210, may alternatively be mounted on the lamp ECU 560.

The high-definition lamp unit 110 is supported by a lamp bracket 568. The lamp bracket 568 is structured to be tiltable in the pitching direction. The leveling actuator 562 can align the lamp bracket 568 in the pitching direction. The leveling actuator 562 may be used for optical axis adjustment (aiming) of the high-definition lamp unit 110.

Figure 28:
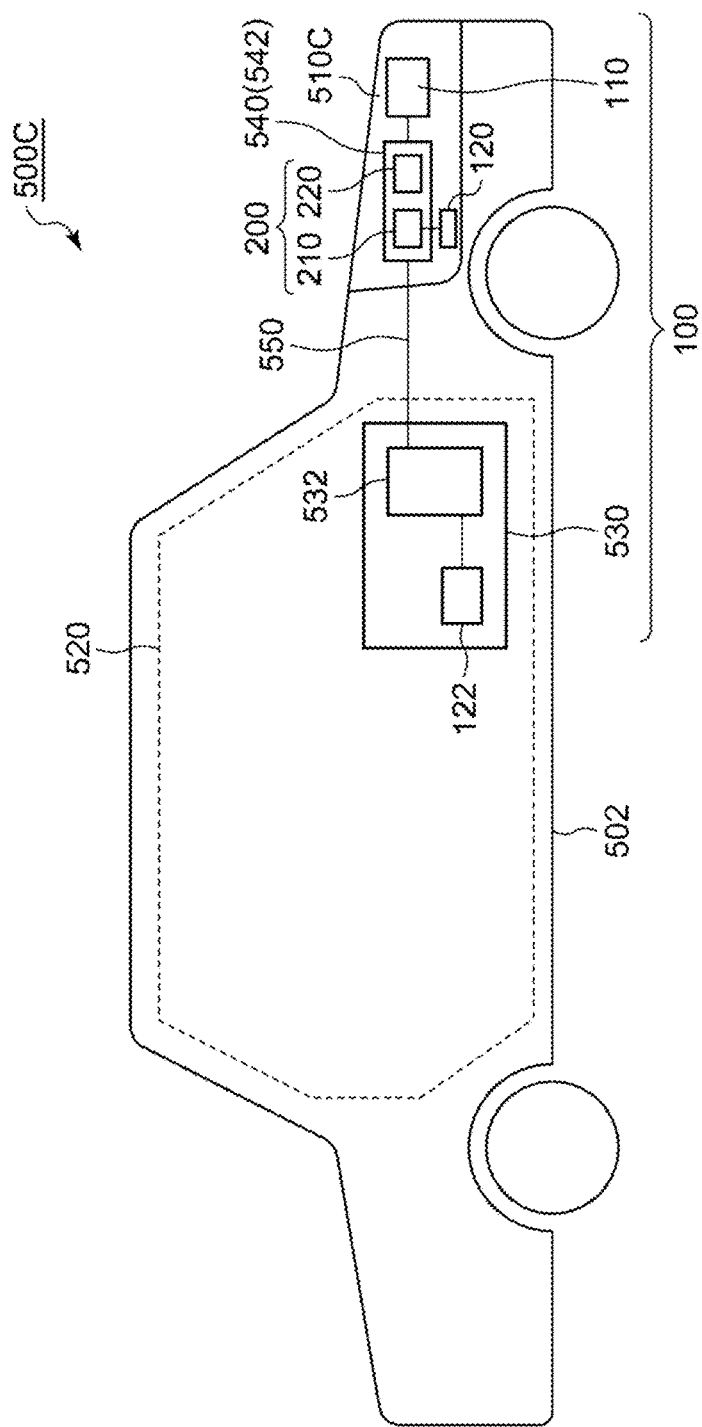
FIG. 28 is a drawing illustrating another exemplary design of a vehicle equipped with a lamp system.

FIG. 28 is a drawing illustrating still another exemplary design of a vehicle 500C equipped with the lamp system 100. The aforementioned arrangement of the gyro sensor, or the first sensor 120, in the cabin needs transmission of information regarding rapid pitch angle variation through the vehicle bus 550, and this limits responsiveness of the lamp system 100 due to transmission delay.

In the example illustrated in FIG. 28, the gyro sensor, or the first sensor 120, is arranged inside the engine room, outside the cabin. More specifically, the first sensor 120 is arranged in the headlamp 510C. That is, the first sensor 120 is one of the components of the headlamp 510C, and may be built in the headlamp 510C, or may be externally attached to the headlamp 510C.

In this example, also the controller 200 that contains the pitch angle calculator 210 and the cut-off line controller 220 are built in the headlamp 510.

Connection between the controller 200 and the first sensor 120 needs no vehicle bus such as CAN, and can employ a faster interface with smaller delay. The interface used herein may be any of known serial interface or parallel interface, without particular limitations on the types. For example, the serial interface used herein may be serial peripheral interface (SPI), or $I^2C$.

Note that the output of the second sensor 122 is less likely to cause a problem of transmission delay, since the output is mainly used to detect the static pitch angle θs whose frequency band is low. The second sensor 122 is, therefore, arranged outside the cabin. The conversion from the output of the second sensor 122 to the second pitch angle θa may be conducted in the second processor 542 that contains the pitch angle calculator 210. The first processor 532 in this case functions as an interface of the vehicle bus 550.

Alternatively, the conversion from the output of the second sensor 122 to the second pitch angle θa may be conducted in the first processor 532.

The structure illustrated in FIG. 28 enables use of a high-speed serial or parallel interface without using the vehicle bus, by arranging the gyro sensor on the headlamp side, and thus can significantly reduce the transmission delay, and can enhance the followability of the leveling.

Figure 29:
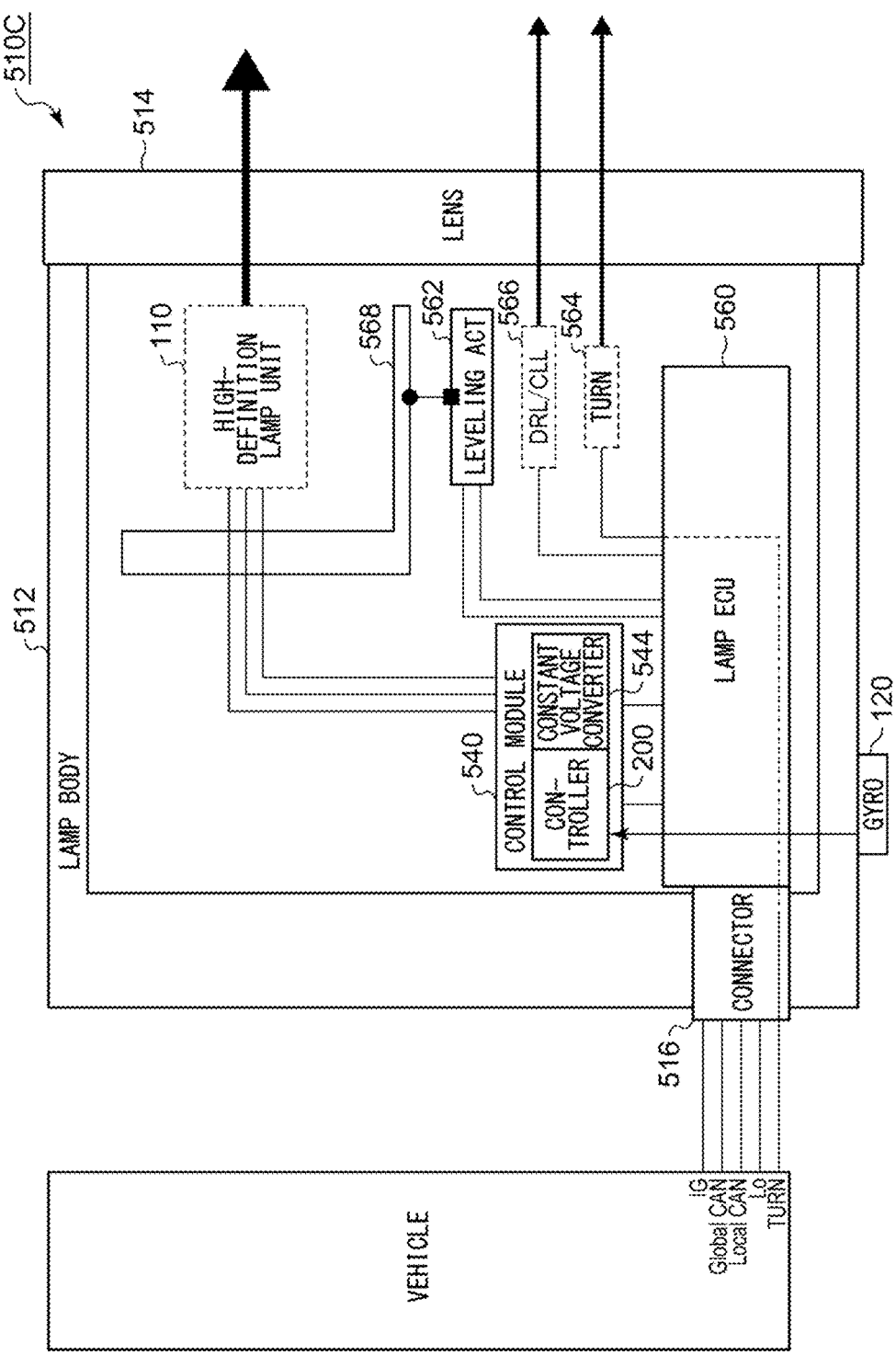
FIG. 29 is a drawing illustrating an exemplary structure of a headlamp.

FIG. 29 is a drawing illustrating an exemplary structure of a headlamp 510C. Basic structure of the headlamp 510C is similar to that of the headlamp 510 illustrated in FIG. 27.

In this structure, the gyro sensor, or the first sensor 120, is fixed to the lamp body 512. The gyro sensor, thus directly fixed to the lamp body of the highest rigidity, can enhance the detection accuracy. As described previously, the first sensor 120 and the controller 200 are connected through a serial or parallel local transmission line, rather than through the CAN interface. Note that the signal transmission from the first sensor 120 to the controller 200 may be, but not necessarily, routed through the lamp ECU 560.

The gyro sensor is more preferably fixed to the bottom face of the lamp body 512. The lamp body tends to have a temperature distribution inside thereof, which is hotter towards the top, and is colder towards the bottom. Therefore, placement of the gyro sensor, to the bottom face where the temperature is relatively low, can reduce influence of heat possibly exerted on the gyro sensor.

In the structure illustrated in FIG. 29, the first sensor 120 is arranged outside the bottom face of the lamp body. Temperature tends to be lower in the outside of the lamp body 512, than in the inside. Placement of the gyro sensor, to the outside of the lamp body, can therefore reduce influence of heat possibly exerted on the gyro sensor.

Figure 30:
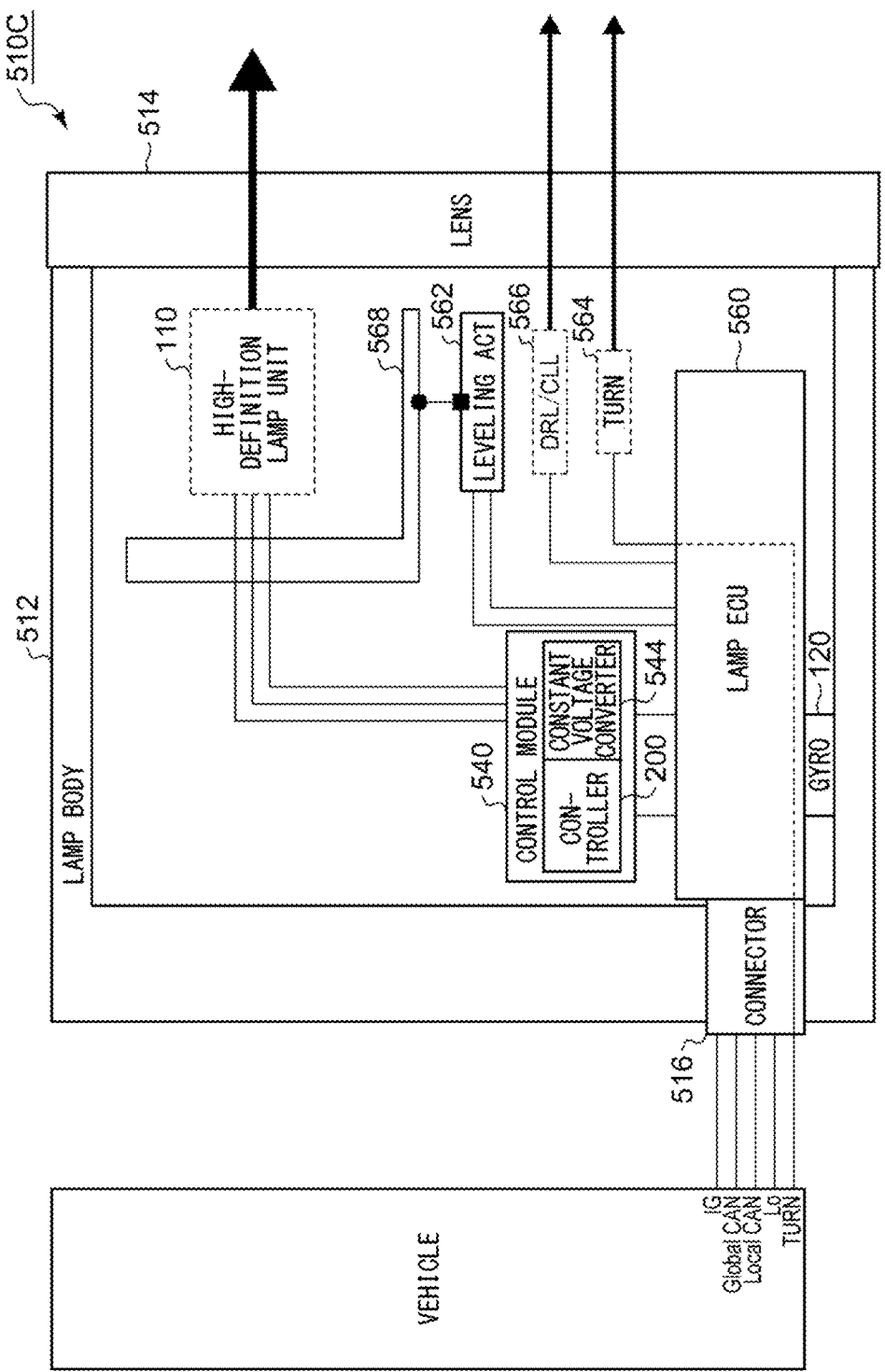
FIG. 30 is a drawing illustrating an exemplary structure of a headlamp.

FIG. 30 is a drawing illustrating another exemplary structure of a headlamp 510C. The basic structure of the headlamp 510C illustrated in FIG. 30 is similar to that of the headlamp 510C illustrated in FIG. 29, with the gyro sensor, or the first sensor 120, arranged on the bottom face side of the lamp body 512. The difference from FIG. 29 is that the first sensor 120 is arranged inside the lamp body 512. This arrangement, although disadvantageous in terms of heat as compared with FIG. 29, can unitize the first sensor 120 and the lamp ECU 560. This successfully simplifies the structure of the headlamp 510C.

Figure 31:
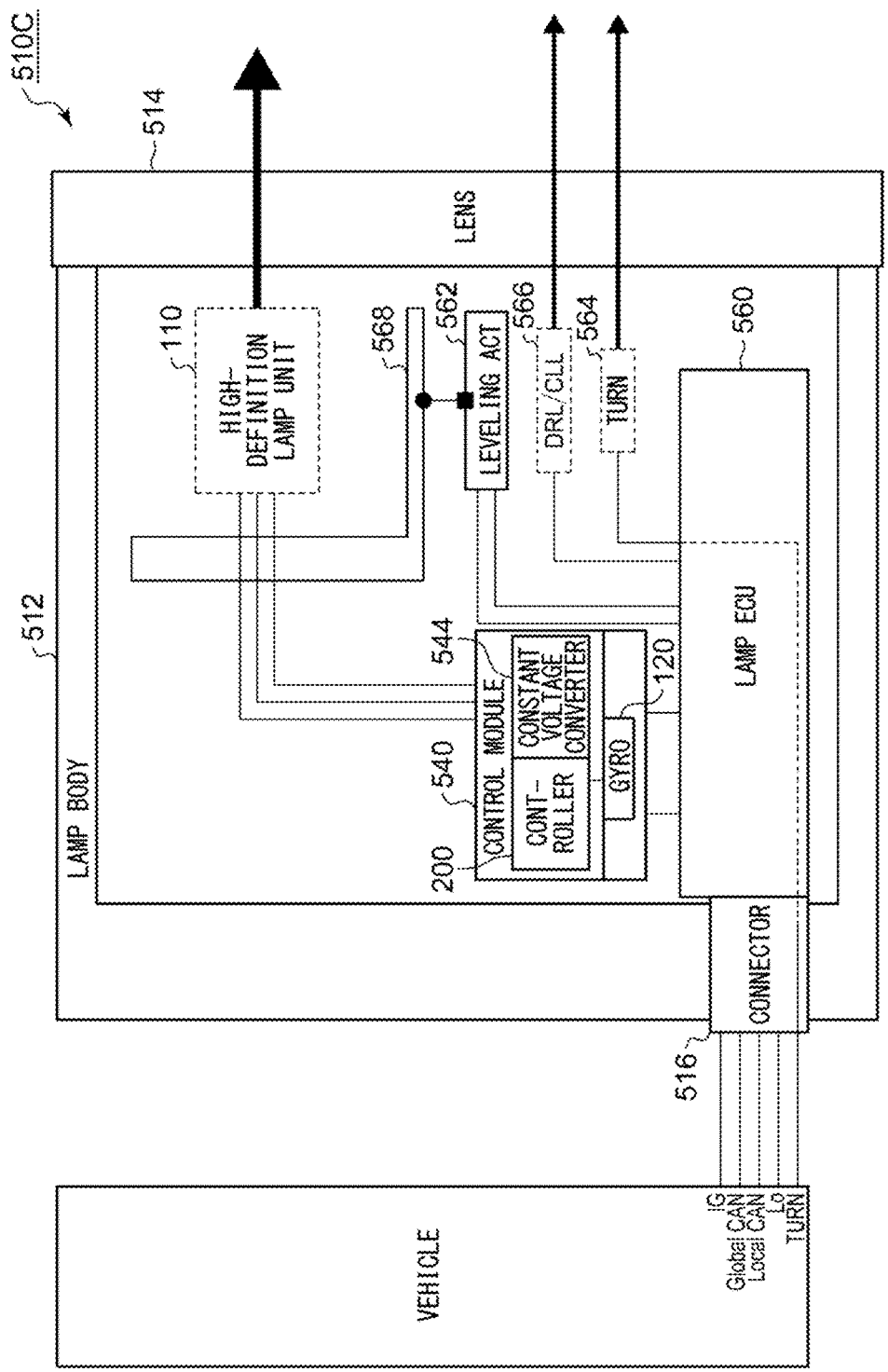
FIG. 31 is a drawing illustrating an exemplary structure of a headlamp.

FIG. 31 is a drawing illustrating another exemplary structure of a headlamp 510C. In the headlamp 510C illustrated in FIG. 31, the gyro sensor, or the first sensor 120 is built in the control module 540. The controller 200 and the first sensor 120 are preferably mounted on the same control board.

This arrangement, although disadvantageous in terms of heat as compared with FIG. 29, can directly connect the gyro sensor and the controller 200, thus successfully simplifying the structure and reducing the cost. The arrangement is also advantageous from the viewpoint of transmission speed.

Having described the present disclosure with use of specific terms referring to the embodiments, the embodiments merely illustrate the principle and applications of the present disclosure, allowing a variety of modifications and layout change without departing from the spirit of the present disclosure specified by the claims.

What is claimed is:

1. A lamp system comprising:
 an adaptive driving beam lamp structured to emit lamp beam with a variable light distribution;
 a first sensor that contains a gyro sensor;
 a second sensor that contains a vehicle height sensor or an acceleration sensor; and
 a controller structured to shift a height of a cut-off line of the light distribution, wherein the height is determined based on a vehicle pitch angle calculated from an output of the first sensor and a vehicle pitch angle calculated from an output of the second sensor.

2. The lamp system according to claim 1, wherein the controller is structured to control the height of the cut-off line, with reference to a synthetic value of a first pitch angle derived from the output of the first sensor, and a second pitch angle derived from the output of the second sensor.

3. The lamp system according to claim 2, wherein the synthetic value is derived from a weighted sum of the first pitch angle and the second pitch angle, with a weighting factor dynamically variable.

4. The lamp system according to claim 3, wherein the weighting factor varies with at least one of the output of the first sensor, the output of the second sensor, the first pitch angle, and the second pitch angle.

5. The lamp system according to claim 3, wherein the weighting factor varies with information from a vehicle.

6. The lamp system according to claim 5, wherein the information from the vehicle includes at least one of vehicle speed, steering angle, camera image, map information, or infrastructure information.

7. The lamp system according to claim 3, wherein the weighting factor varies with travel situation.

8. The lamp system according to claim 1, wherein the output of the first sensor is dominant, upon travel across a large step.

9. The lamp system according to claim 1, wherein the output of the second sensor is dominant during standing.

10. The lamp system according to claim 1, wherein the output of the second sensor is dominant during travel on a flat road.

11. The lamp system according to claim 1, wherein the output of the second sensor is dominant during travel over small irregularity.

12. The lamp system according to claim 1, wherein the output of the first sensor is dominant at a start point of a slope.

13. The lamp system according to claim 1, wherein the output of the second sensor is dominant at a point in the middle of a slope.

14. The lamp system according to claim 1, wherein the output of the first sensor is dominant at an end point of a slope.

15. The lamp system according to claim 1, wherein the output of the first sensor is dominant, upon sudden acceleration or sudden deceleration of a vehicle body.

16. A method for controlling an adaptive driving beam lamp structured to emit lamp beam with a variable light distribution, the method comprising:
 monitoring a state of a vehicle body, with use of a first sensor that contains a gyro sensor, and a second sensor that contains a vehicle height sensor or an acceleration sensor; and shifting a height of a cut-off line of the light distribution, wherein the height is determined based on a vehicle pitch angle calculated from an output of the first sensor and a vehicle pitch angle calculated from an output of the second sensor.

17. A lamp system comprising:
an adaptive driving beam lamp structured to emit lamp beam with a variable light distribution;
a first sensor that contains a gyro sensor; and
a controller structured to shift a height of a cut-off line of the light distribution, corresponding to an output of the first sensor,
the first sensor being arranged on a vehicle side,
wherein the controller comprises:
a first processor that is arranged on the vehicle side, and structured to calculate a first pitch angle in response to an output of the first sensor; and
a second processor that is arranged on the vehicle side, and is structured to receive an output of the first processor through a vehicle bus, and to control the height of the cut-off line of the light distribution, in response to the output.

18. The lamp system according to claim 17, wherein the first sensor and the first processor are unitized.

19. The lamp system according to claim 17, further comprising a second sensor that contains an acceleration sensor or a vehicle height sensor arranged on the vehicle side, wherein
the first processor is structured to calculate a second pitch angle in response to an output of the second sensor, and to output the second pitch angle to the second processor.

20. The lamp system according to claim 19, wherein the second sensor contains the acceleration sensor, and
the gyro sensor and the acceleration sensor are unitized as a six-axis sensor.

21. The lamp system according to claim 17, wherein the first processor is structured to generate a future predicted value of the first pitch angle, in response to the output of the first sensor, and
the second processor is structured to shift the height of the cut-off line in response to the predicted value.

22. The lamp system according to claim 21, wherein the first processor is structured to conduct Fourier transformation of the output of the first sensor, and to generate the predicted value of the first pitch angle, corresponding to a frequency component contained in the transformed result.

23. The lamp system according to claim 21, wherein the first processor is structured to output a provisional predicted value upon start of vibration, and then to output the predicted value generated by processing.

24. The lamp system according to claim 17, wherein, in a case where vibration preceded by nose-dive occurred on a vehicle on which the adaptive driving beam lamp is mounted, the controller is structured to keep the height of the cut-off line unchanged, during a period of the first nose-dive.

25. The lamp system according to claim 17, wherein, in a case where vibration preceded by nose-up occurred on a vehicle on which the adaptive driving beam lamp is mounted, the controller is structured to lower the height of the cut-off line by a predetermined range, during a period of the first nose-dive.

26. The lamp system according to claim 17, wherein the vehicle side resides in a cabin.

27. A lamp system comprising:
an adaptive driving beam lamp structured to emit lamp beam with a variable light distribution;
a first sensor that contains a gyro sensor; and
a controller structured to shift a height of a cut-off line of the light distribution, corresponding to an output of the first sensor,
the first sensor being arranged on a vehicle side,
wherein, in a case where vibration preceded by nose-up occurred on a vehicle on which the adaptive driving beam lamp is mounted, the controller is structured to reduce brightness around the cut-off line, while keeping the height of the cut-off line unchanged, during a period of the first nose-dive.

28. A lamp system comprising:
an adaptive driving beam lamp structured to emit lamp beam with a variable light distribution;
a first sensor that contains a gyro sensor; and
a controller structured to shift a height of a cut-off line of the light distribution, corresponding to an output of the first sensor,
the first sensor being arranged on a vehicle side,
wherein the adaptive driving beam lamp contains a plurality of individually controllable pixels, and is structured to create light distribution corresponding to states of the pixels, and
the controller is structured to shift a boundary between an on-pixel and an off-pixel from among the pixels up and down.

29. A lamp system comprising:
an adaptive driving beam lamp arranged in a headlamp, and is structured to emit lamp beam with a variable light distribution;
a first sensor that contains a gyro sensor arranged in the headlamp, or externally attached to the headlamp; and
a controller structured to shift a height of a cut-off line of the light distribution, wherein the height is determined based on a vehicle pitch angle calculated from an output of the first sensor.

30. The lamp system according to claim 29, wherein the gyro sensor is fixed to a lamp body.

31. The lamp system according to claim 30, wherein the gyro sensor is fixed to a bottom face of the lamp body.

32. The lamp system according to claim 31, wherein the gyro sensor is fixed to an inner side of the bottom face of the lamp body.

33. The lamp system according to claim 31, wherein the gyro sensor is fixed to an outside of the bottom face of the lamp body.

34. The lamp system according to claim 29, wherein the gyro sensor is unitized together with the controller.

35. The lamp system according to claim 29, further comprising a second sensor that contains an acceleration sensor or a vehicle height sensor arranged in a cabin, wherein
the controller is structured to control the height of the cut-off line, in response to an output of the first sensor and an output of the second sensor.

36. The lamp system according to claim 29, wherein the adaptive driving beam lamp contains a plurality of individually controllable pixels, and is structured to create light distribution corresponding to states of the pixels, and
the controller is structured to shift a boundary between an on-pixel and an off-pixel from among the pixels up and down.

* * * * *